(12) United States Patent
Northcutt

(10) Patent No.: US 11,925,139 B2
(45) Date of Patent: Mar. 12, 2024

(54) PERMANENT LAWN MOWER

(71) Applicant: Kevin Northcutt, St. Petersburg, FL (US)

(72) Inventor: Kevin Northcutt, St. Petersburg, FL (US)

(*) Notice: Subject to any disclaimer, the term of this patent is extended or adjusted under 35 U.S.C. 154(b) by 284 days.

(21) Appl. No.: 17/354,273

(22) Filed: Jun. 22, 2021

(65) Prior Publication Data
US 2021/0392813 A1 Dec. 23, 2021

Related U.S. Application Data

(60) Provisional application No. 63/042,138, filed on Jun. 22, 2020.

(51) Int. Cl.
| | | |
|---|---|---|
| *A01D 34/01* | (2006.01) | |
| *A01D 34/835* | (2006.01) | |
| *A01D 101/00* | (2006.01) | |

(52) U.S. Cl.
CPC ......... *A01D 34/015* (2013.01); *A01D 34/835* (2013.01); *A01D 2101/00* (2013.01)

(58) Field of Classification Search
CPC ........ A01D 2101/00; A01D 34/00–905; A01G 3/00–3/088
See application file for complete search history.

(56) References Cited

U.S. PATENT DOCUMENTS

| | | | | |
|---|---|---|---|---|
| 1,956,145 A | * | 4/1934 | Burkhart | A01G 25/165 |
| | | | | 239/242 |
| 2008/0244970 A1 | * | 10/2008 | Ide | A01D 34/015 |
| | | | | 43/132.1 |
| 2010/0050584 A1 | * | 3/2010 | Whitehead | A01D 34/416 |
| | | | | 56/10.2 A |

FOREIGN PATENT DOCUMENTS

| | | | | |
|---|---|---|---|---|
| CN | 112293211 A | * | 2/2021 | |
| DE | 3135927 A | * | 3/1983 | ........... A01D 34/015 |
| GB | 2093327 A | * | 9/1982 | ........... A01D 34/015 |

* cited by examiner

*Primary Examiner* — Adam J Behrens
*Assistant Examiner* — Madeline I Runco
(74) *Attorney, Agent, or Firm* — Larson & Larson; Justin P. Miller; Frank Liebenow

(57) ABSTRACT

The permanent lawn mower, or inground lawn mower, is designed to be an alternative to conventional mobile mowing. Its focus is small grassy areas that are dangerous or impractical to mow by other means. In a first embodiment, the system includes three primary components: a drive unit that supplies rotational motion; a cable that carries rotational motion away from the drive unit, and one or more cutting heads that convert the rotational motion into a cutting action. In a second embodiment, the drive unit is combined with the cutting head, avoiding the need for a cable to carry rotational motion.

11 Claims, 30 Drawing Sheets

PERMANENT LAWN MOWER

RELATED APPLICATIONS

This application claims priority to U.S. application Ser. No. 63/042,138, filed Jun. 22, 2020, titled Permanent lawn mower.

FIELD

This invention relates to the field of law maintenance and more particularly to a lawn mower that is installed in a fixed position, rather than moved from place-to-place.

BACKGROUND

The maintenance of grassy areas is on-going, requiring regular attention. While the commonly-available mobile lawn mowers are generally the best solution, certain areas are too costly or difficult to access, making mobile mowing a difficult or dangerous solution.

For example, medians near roadways, small lawns with limited access, or areas with consistent traffic where off-hours mowing is impractical.

What is needed is a hidden mower system that remains in place, to be activated during off-hours, that then retracts itself until it is again time to mow.

SUMMARY

The permanent lawn mower, or inground lawn mower, is designed to be an alternative to conventional mobile mowing. Its focus is small grassy areas that are dangerous or impractical to mow by other means.

In a first embodiment, the system includes three primary components: a drive unit that supplies rotational motion; a cable that carries rotational motion away from the drive unit, and one or more cutting heads that convert the rotational motion into a cutting action.

In a second embodiment, the drive unit is combined with the cutting head, avoiding the need for a cable to carry rotational motion.

Turning to the first embodiment:

The drive unit is a combination of electronics, an electric motor, gear box, and cable connections.

The cables are flexible rods sheathed in protective sleeves. The rotation of the drive rods within the protective sleeves carries the rotational motion, created by the drive unit, to the cutting heads.

The cutting heads are fully mechanical. The cutting heads are generally in a retracted state. When activated by motion, the heads extend, the blade is released, then cutting and rotating. After a cutting cycle is complete, the cutting head retracts.

The permanent lawn mower is designed for simple installation. The cutting heads are installed like stakes, being pressed or hammered into the ground. A narrow trench makes room for the cables, with the driver installed in a small hole.

The cutting heads can be daisy-chained, or connected to each other, ultimately connecting back to the driver. This allows for many cutting heads to be installed at a great distance from the driver.

The system is preferably electronically controlled. The electronics include, include, for example:

Batteries, such as 18650 style lithium-ion batteries;
  Preferred embodiment includes four batteries;
Battery holders;
Charging boards to manage battery recharging;
Arduino or similar controller;
Wireless interface for controller, such as Bluetooth® interface;
Speed controller;
Battery Management System (BMS) to control battery balancing and upper/lower voltage limits;
Electric motor; and
Solar panel for power input.

These components can be separate, or integrated into one or more circuit boards.

The electronics are preferably sealed within the housing of the drive unit where they are protected against water and other contaminants.

The cutting heads are the most mechanically-complex portion of the permanent lawn mower, and thus additional explanation is helpful.

The movement of the cutting head is divided into phases, each of which has a different motion:

Phase 1—fully retracted
Phase 2—extending
Phase 3—fully extended, cutting
Phase 4—retracting
Phase 5—fully retracted At different phases, different primary components are activated to cause motion.

Phase 1—Fully Retracted

The cutting head is waiting for activation.

Phase 2—Extending

A clockwise motion of the cable rotates a vertical transmission gear, which rotates a horizontal cutting head shaft gear and associated cutting head shaft.

Initially, the ascender does not interface with the cutting head shaft. This avoids damage from over-rotation during retraction—see Phase 5.

Rather, cutting head shaft gear directly rotates the ascender via a clutch.

This initial rotation begins the movement of the ascender up the threaded inside of the tube, past the smooth lower section of the cutting head shaft. After the ascender has moved past the smooth lower section, the ascender interfaces with the splined center section of the cutting head shaft. Above this point the cutting head shaft directly rotates the ascender. The ascender then continues to climb the inside of the tube.

Phase 3—Fully Extended and Cutting

When the ascender reaches the smooth upper section of the cutting head shaft, the ascender stops rotating.

The cutting head shaft continues to rotate, the splined head of the cutting head shaft locking into the driver.

The driver translates the rotational movement of the cutting head shaft into two movements—a lateral movement of the cutting blade, and an intermittent rotational movement of the orbital and top housing.

This combination of movements causes the cutting blade to move in and out within the cutting blade guard, and to intermittently rotate around the central axis of the cutting head. Thus, the blade gradually cuts all the grass in its surrounding circle.

As a note, the driver has a clutch interface with the orbital, the clutch interface bypassing in this direction of rotation.

After the top housing has moved 360 degrees, the blade and blade guide hinges are aligned, allowing the blade and blade guide to fold.

Phase 4—Retracting

The drive unit reverses direction, causing the cable to reverse direction, in turn causing the cutting head shaft to reverse direction.

At the moment of reversal, only the driver is interfaced with the cutting head shaft. The clutch of the driver now engages the orbital, the orbital rotating the ascender, the ascender, beginning to move down the tube.

As the ascender moves down, the driver disengages from the cutting head shaft, the ascender engages the cutting head shaft, and the ascender moves downward.

Phase 5—Full Retraction

The ascender moves down until it disengages from the cutting head shaft.

The cutting head shaft gear can continue to rotate, but the clutch interface between the cutting head shaft gear and allows the ascender to remain stationary, thus avoiding damage from the ascender over-rotating.

Turning to the second embodiment, the electric motor is moved into the cutting heads. Thus, rather than a single electric motor operating multiple cutting heads, each cutting head has its own motor.

Aside from that change, operation remains the same.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
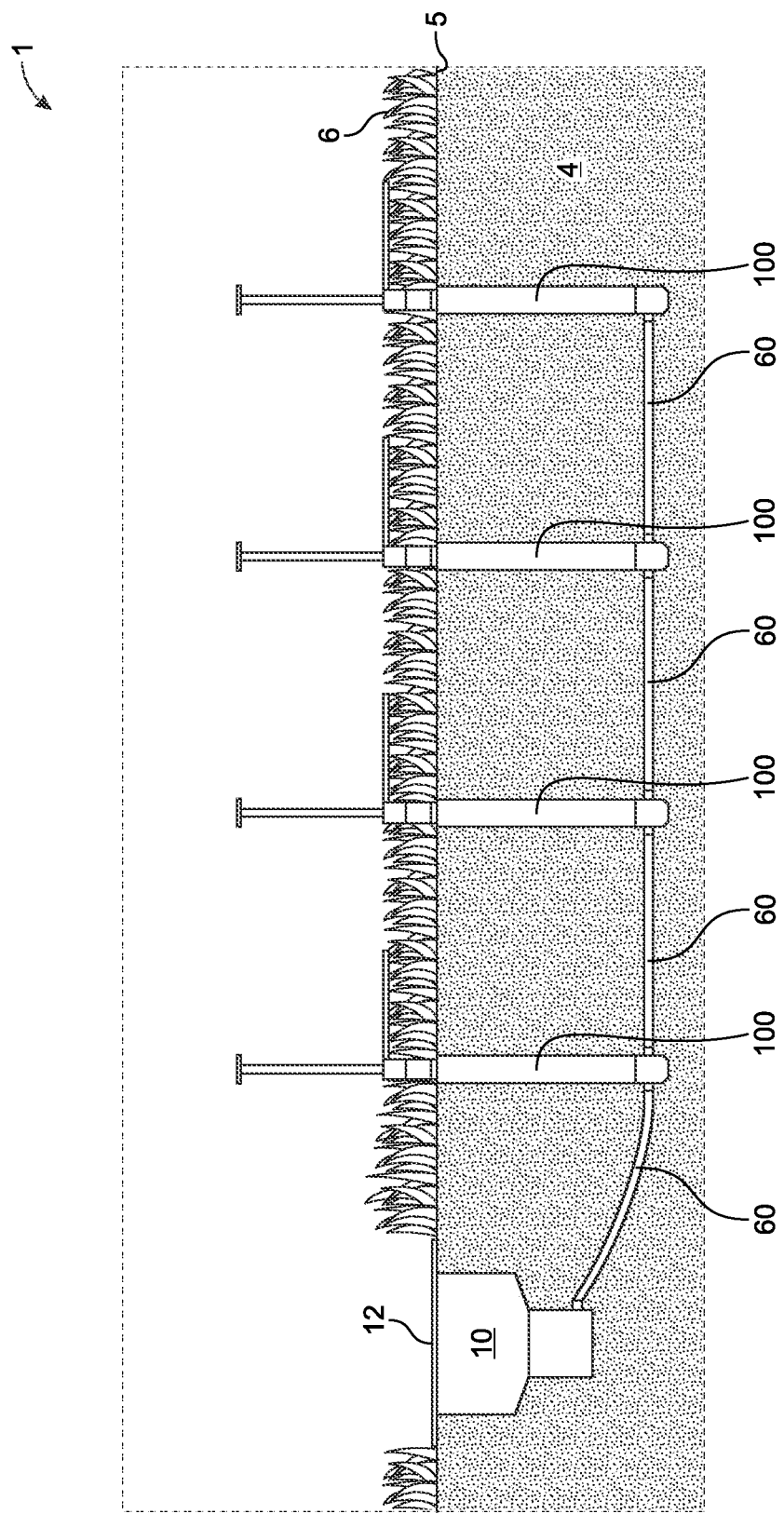
FIG. 1 illustrates an installed side view of the permanent lawn mower.

Reference will now be made in detail to the presently preferred embodiments of the invention, examples of which are illustrated in the accompanying drawings. Throughout the following detailed description, the same reference numerals refer to the same elements in all figures.

Referring to FIG. 1, an installed side view of the permanent lawn mower is shown.

The primary components of the permanent lawn mower 1 are: the drive unit 10; connected via one or more cables 60; to one or more cutting heads 100.

Most components are hidden beneath the surface 5 within the soil 4, rising to cut the grass 6.

The drive unit 10 is shown with solar panel bracket 12.

Figure 2:
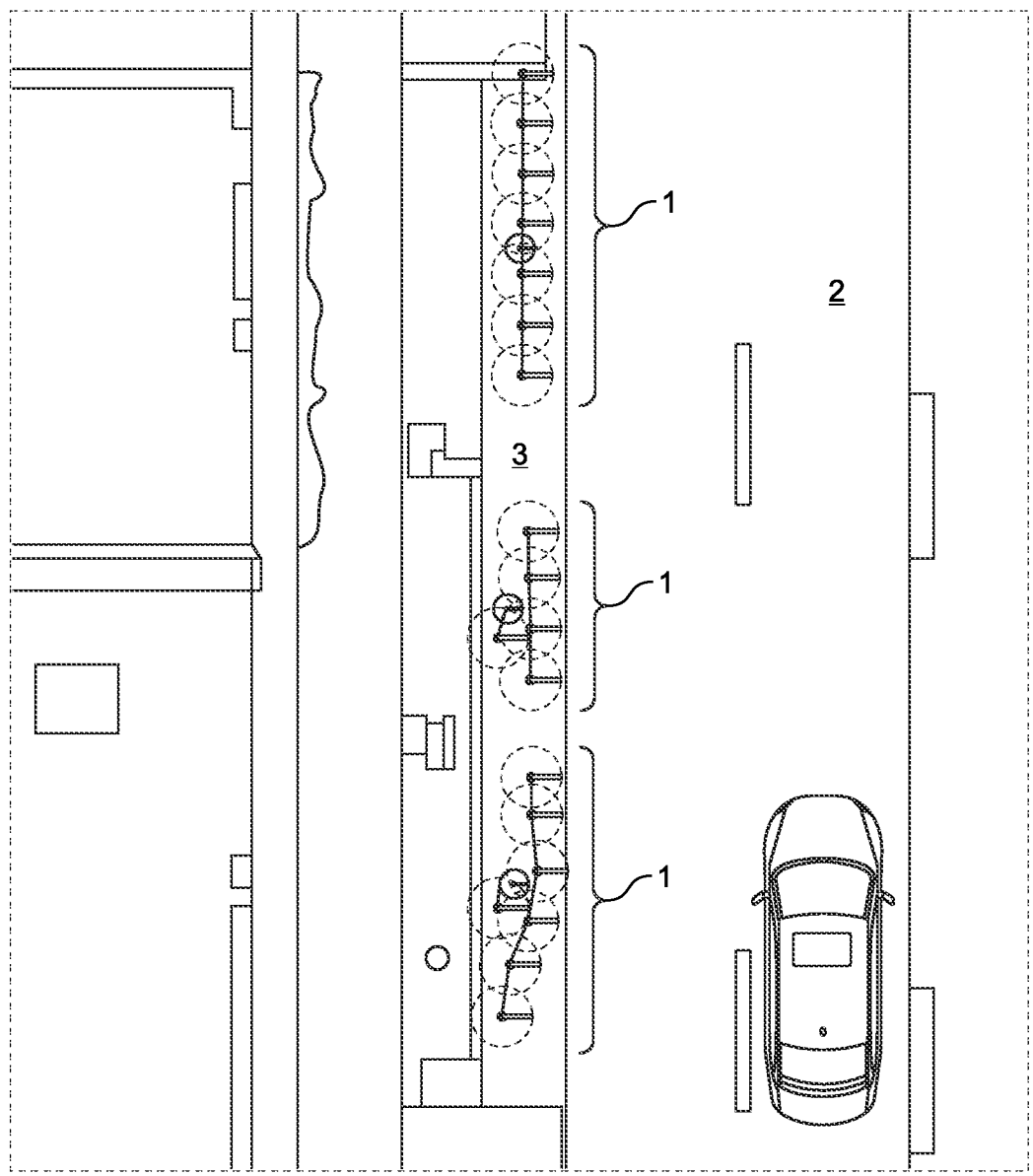
FIG. 2 illustrates an installed top view of the permanent lawn mower.

Referring to FIG. 2, an installed top view of the permanent lawn mower is shown.

In a typical installation, multiple permanent lawn mowers 1 are installed in a median 3 adjacent to a road 2, where access by a mobile lawn mower is difficult.

Figure 3:
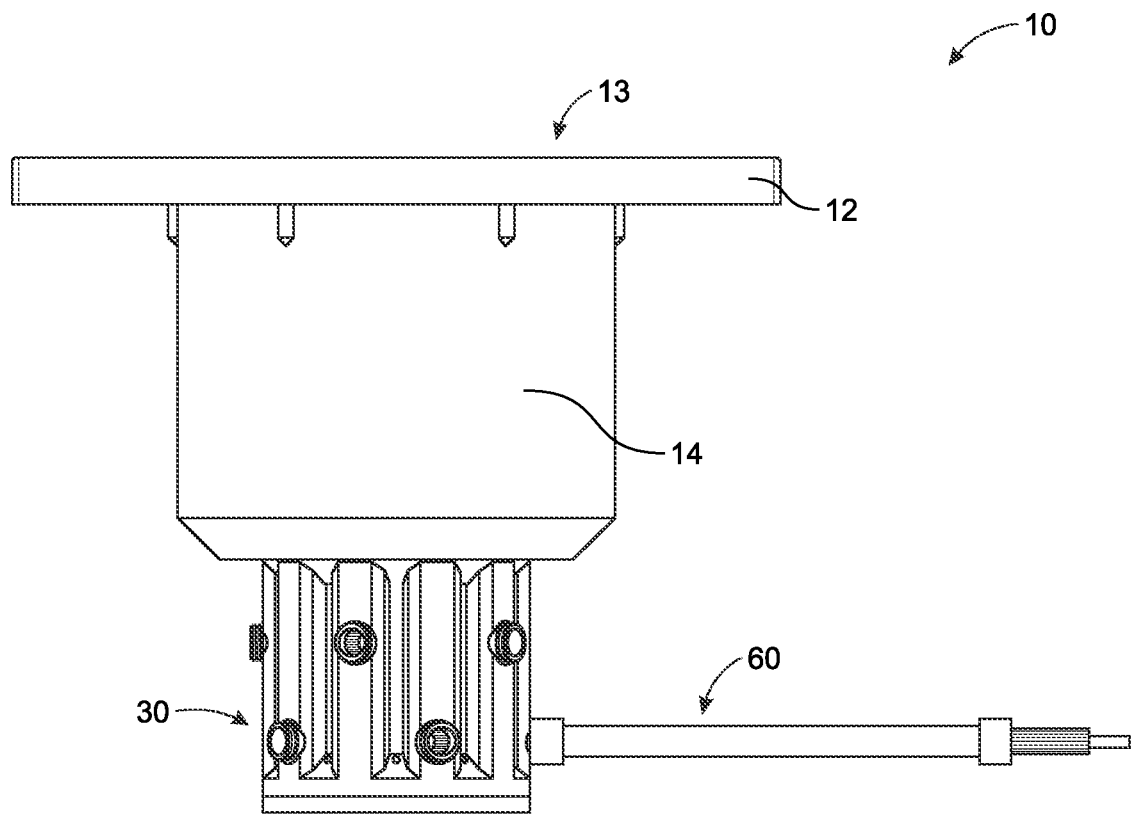
FIG. 3 illustrates a side view of the drive unit and cable of the permanent lawn mower.

Referring to FIG. 3, a side view of the drive unit and cable of the permanent lawn mower is shown.

The drive unit 10 includes a solar panel bracket 12 and solar panel 13 atop the housing 14.

Beneath is located a gear box 30 that connects to one or more cables 60.

Figure 4:
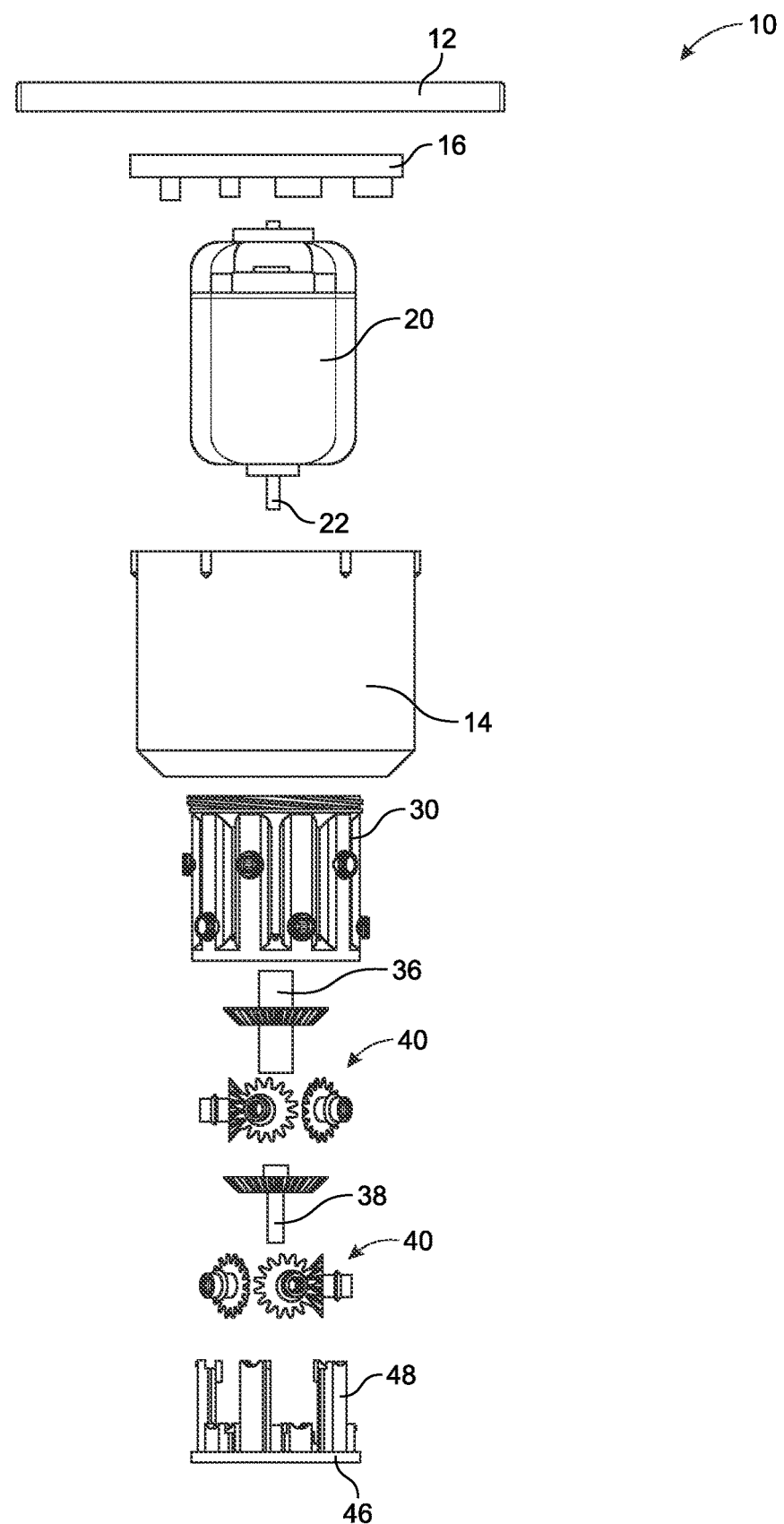
FIG. 4 illustrates an exploded view of the driver of the permanent lawn mower.

Referring to FIG. 4, an exploded view of the driver of the permanent lawn mower is shown.

The drive unit 10 includes a solar panel bracket 12 that acts as a top to the housing 14.

Within the housing 14 are electronics 16, an electric motor 20, from which protrudes a motor shaft 22.

The gear box 30 encloses an upper drive gear 36 and lower drive gear 38, which both connect to line gears 40. The line gears 40 are held in place by the gear support arms 48 of the base cap 46.

Rotation of the motor shaft 22 rotates the upper drive gear 36 and lower drive gear 38, thus rotating the downstream components.

Figure 5:
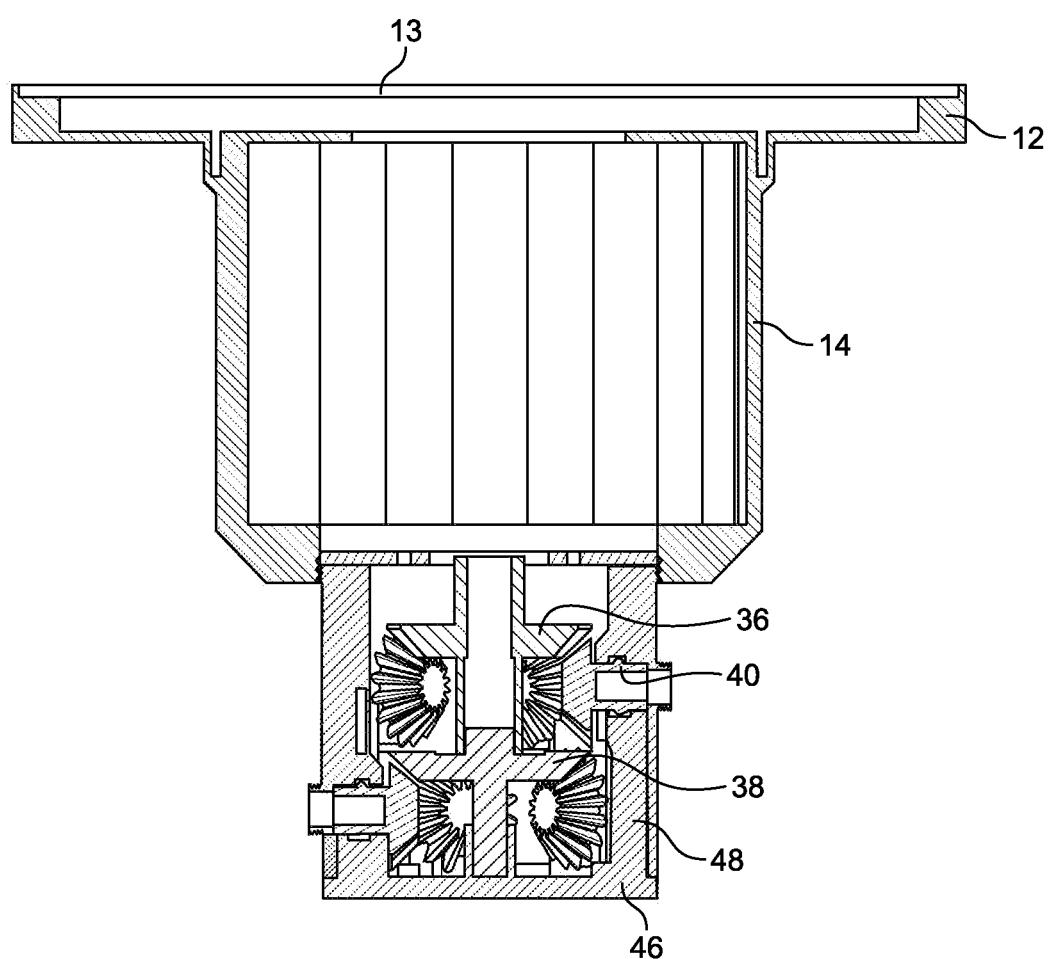
FIG. 5 illustrates a cross-section of the drive unit of the permanent lawn mower.

Referring to FIG. 5, a cross-section of the drive unit of the permanent lawn mower is shown.

The upper drive gear 36 and lower drive gear 38 are shown interfacing with the line gears 40. The gear support arms 48 of the base cap 46 are shown holding the line gears 40 in place.

Figure 6:
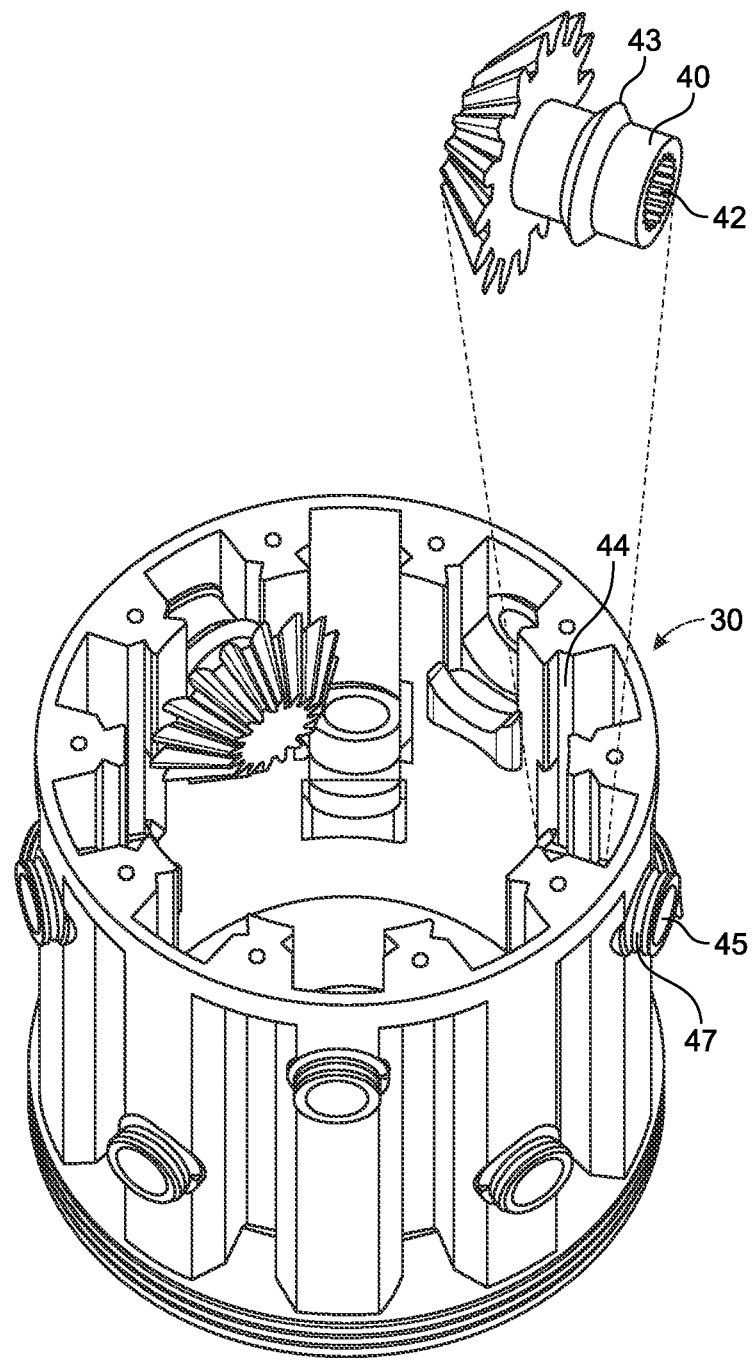
FIG. 6 illustrates a view of the gearbox of the drive unit of the permanent lawn mower.

Referring to FIG. 6, a view of the gearbox of the drive unit of the permanent lawn mower is shown.

The line gears 40 include a gear-centering protrusion 43 that fits within a mounting groove 44 of the gear box 30, holding the line gear 40 in place while permitting rotation.

Figure 7:
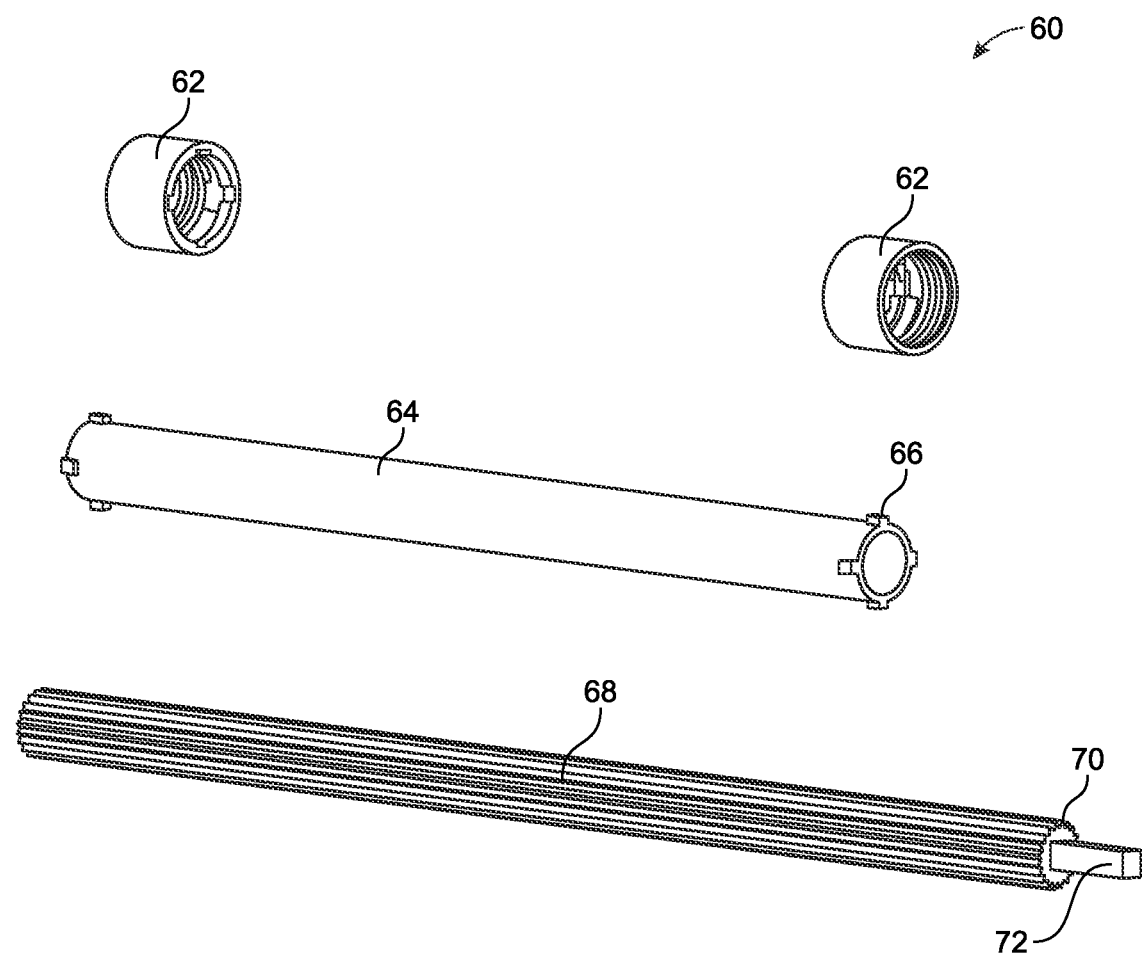
FIG. 7 illustrates an exploded view of the cable of the permanent lawn mower.

A splined connection 42 within the line gears 40 interfaces with drive rods 68 of the cables 60 (see FIG. 7).

The cable entrance 45 includes a threaded protrusion 47 onto which the threaded coupling 62 (see FIG. 7) of the cable 60 (see FIG. 7) is threaded.

Referring to FIG. 7, an exploded view of the cable of the permanent lawn mower is shown.

The cable 60 includes two threaded couplings 62 that affix to the coupling-interface protrusions 66 of the drive rod conduit 64, enclosing the drive rod 68 with splined protrusions 70. Also shown is square protrusion 72.

Figure 8:
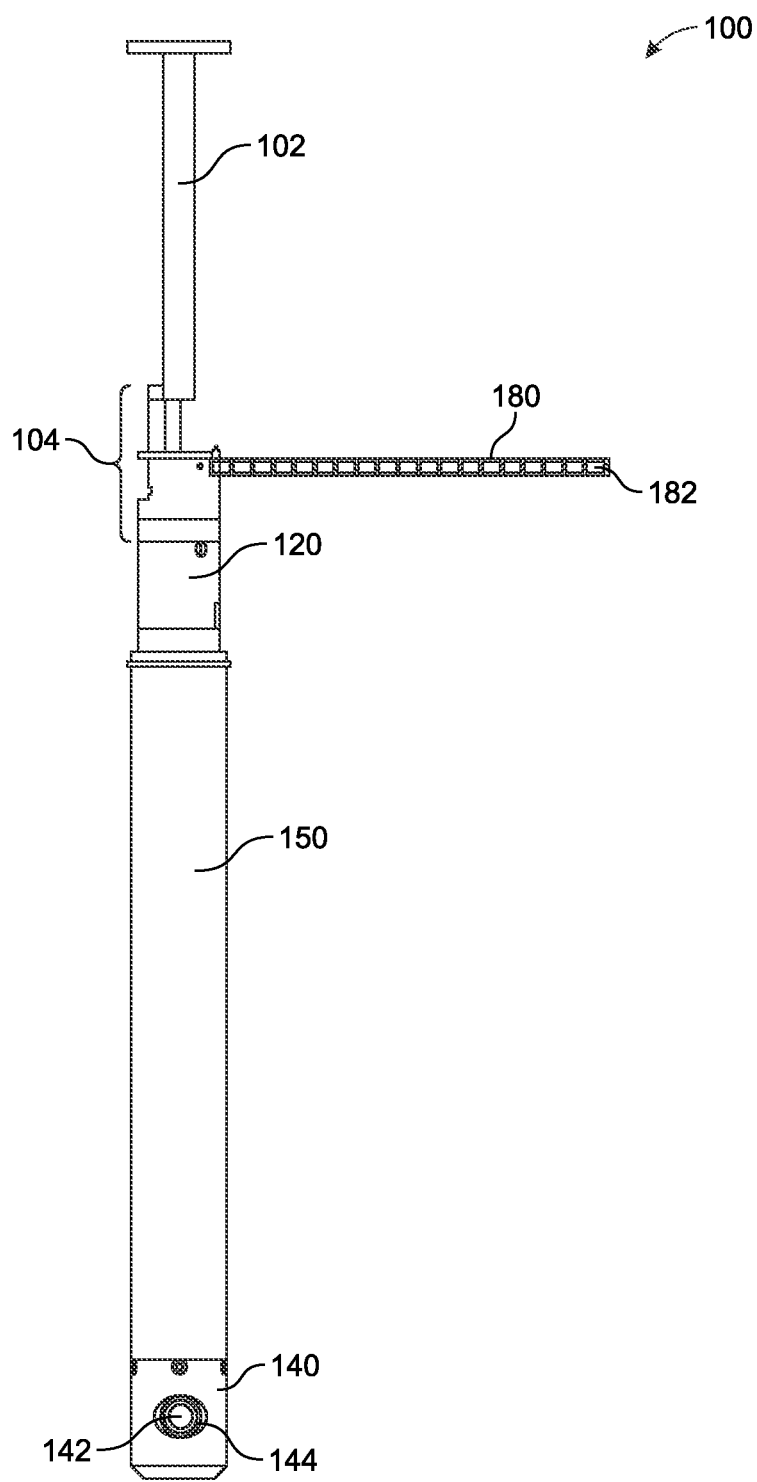
FIG. 8 illustrates a view of the cutting head of the permanent lawn mower.

Referring to FIG. 8, a view of the cutting head of the permanent lawn mower is shown.

The cutting head 100 is shown in a fully extended position.

The cutting head 100 includes a seal 102 connected to the top housing 104. Extending from the top housing 104 is the blade 180 with blade guard 182. Below the top housing 104 is orbital 120, then tube 150, and finally the base 140 with cut head cable entrance 142 and external threads 144.

Figure 9:
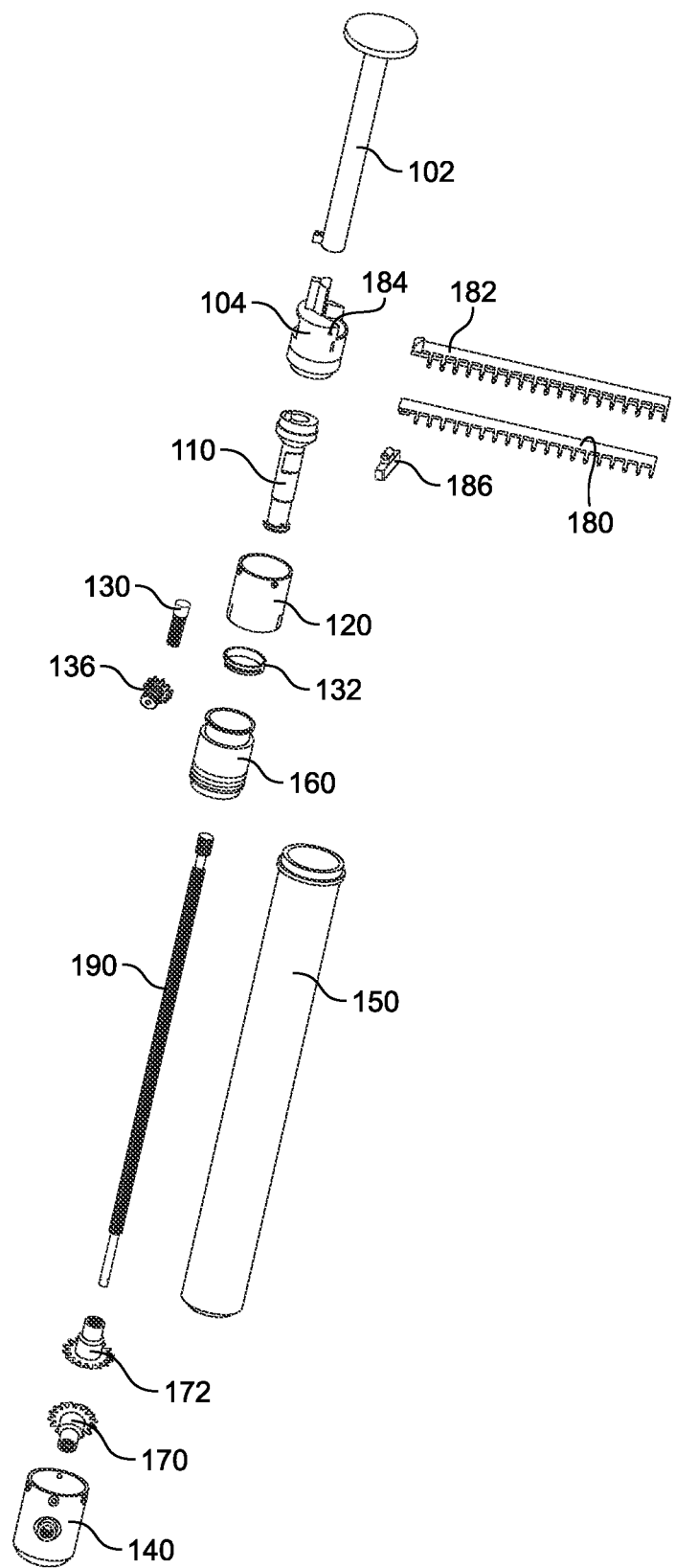
FIG. 9 illustrates a first exploded view of the cutting head of the permanent lawn mower.
Figure 10:
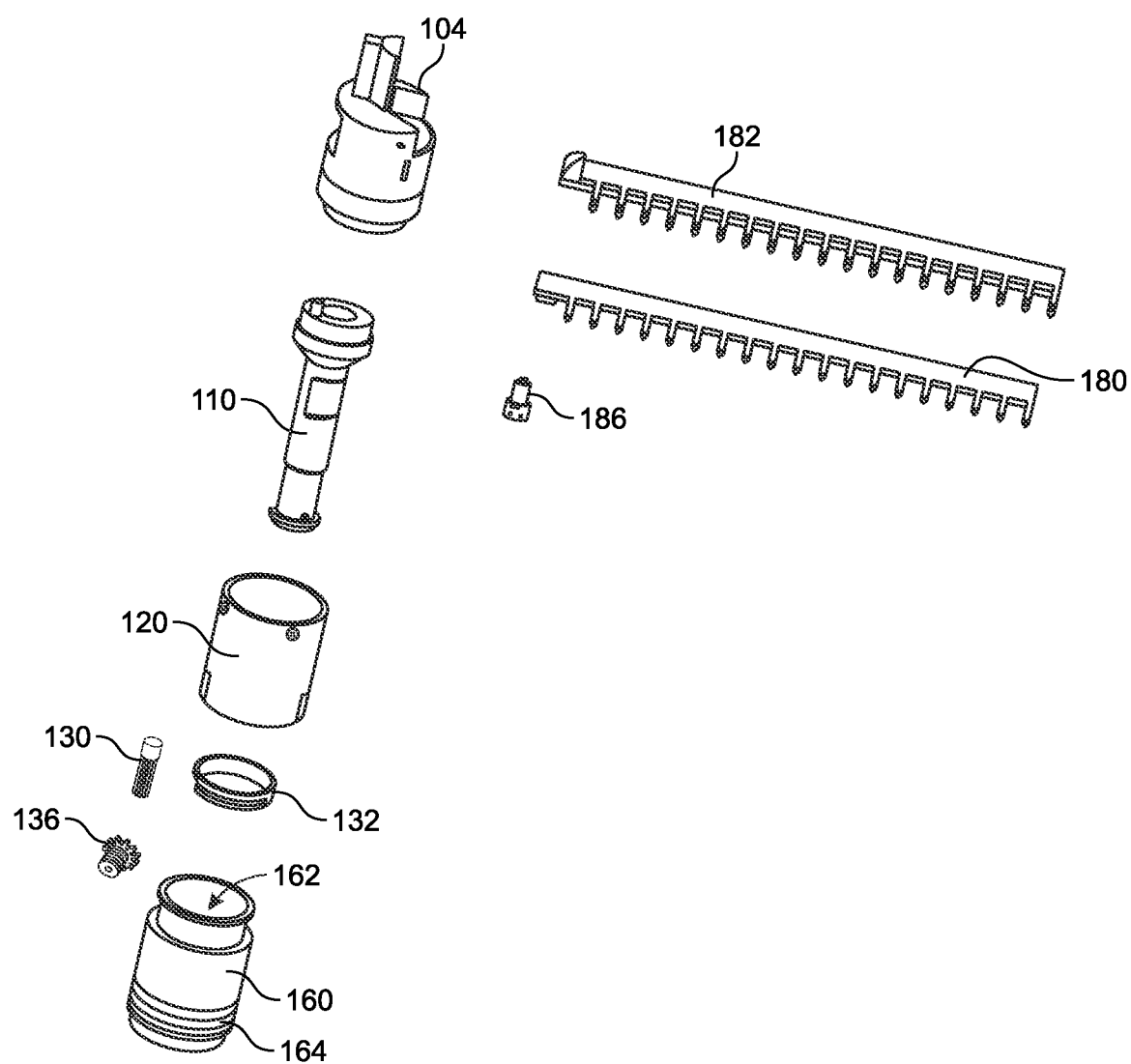
FIG. 10 illustrates a second exploded view of the cutting head of the permanent lawn mower.
Figure 11:
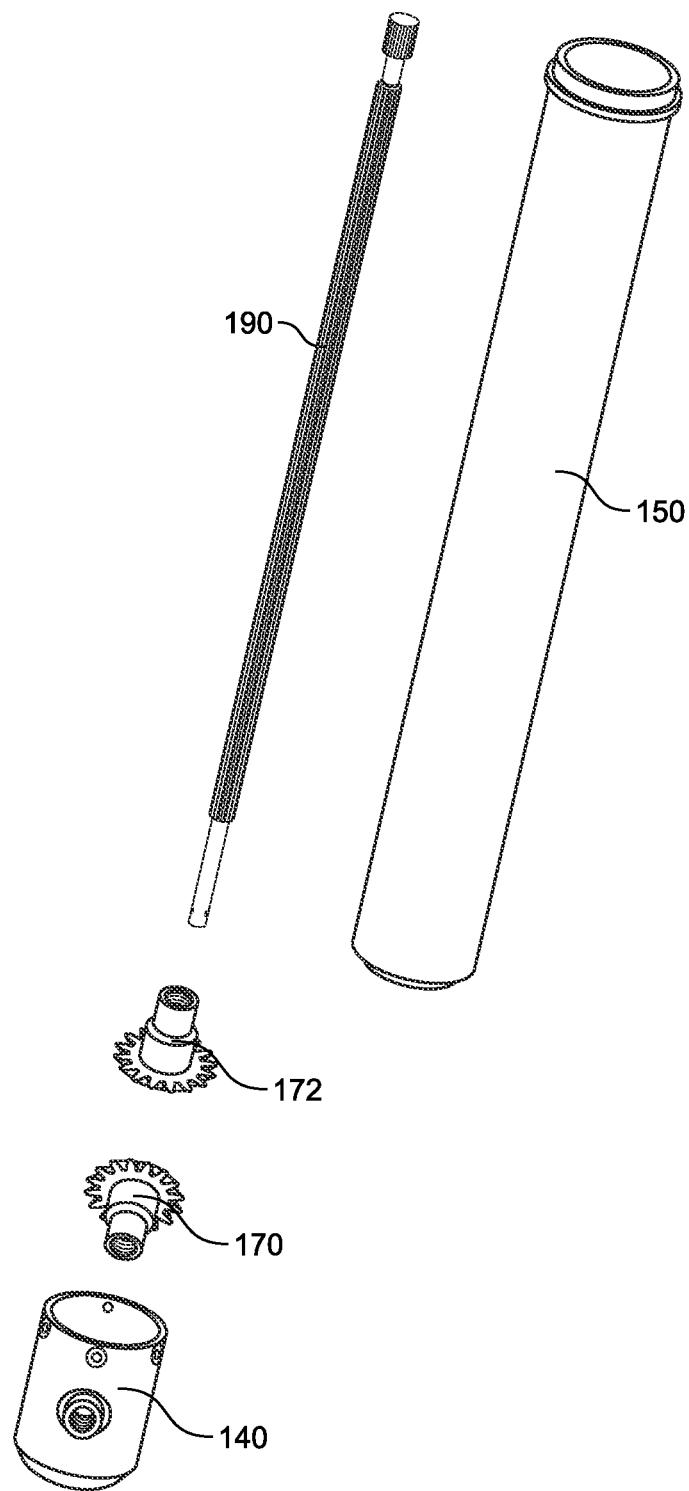
FIG. 11 illustrates a third exploded view of the cutting head of the permanent lawn mower.

Referring to FIGS. 9 through 11, multiple exploded views of the cutting head of the permanent lawn mower are shown.

The cutting head 100 is again shown in a fully extended position.

The seal 102 mounts to the top housing 104, which partially-encloses the driver 110, the driver 110 also enclosed by the orbital 120.

Between the orbital 120 and the ascender 160 is the base cap 132.

The orbital gear 130 and worm gear 136 interact with the driver 110 to create intermittent movement.

When collapsed, the tube 150 surrounds most of the cutting head 100.

The cutting head shaft 190 carries rotational motion from the transmission gear 170 and cutting head shaft gear 172, which, sit within the base 140.

Figure 20:
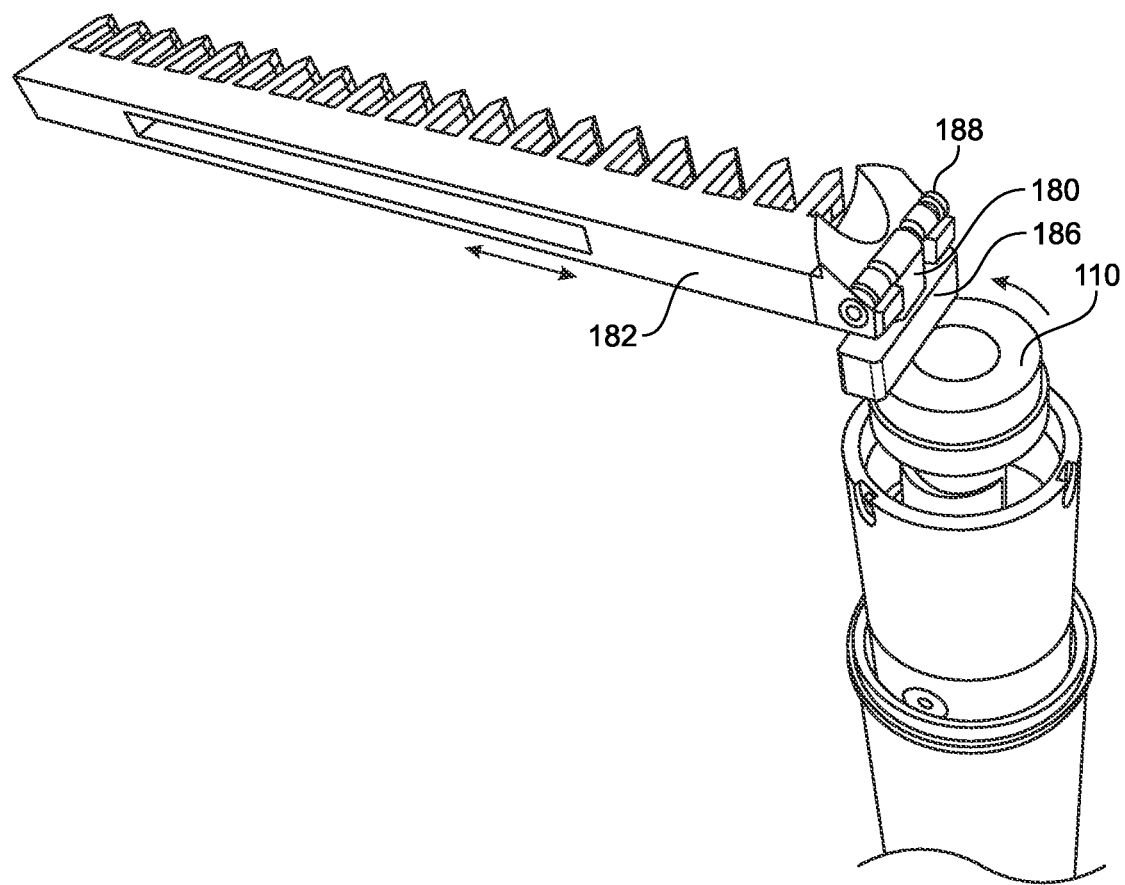
FIG. 20 illustrates a partial view of the cutting head in a cutting position of the permanent lawn mower.

The blade 180 and blade guard 182 attach to the top housing 104 via the blade guard hinge 184 and blade hinge 188 (see FIG. 20). The blade connector 186 helps change the rotational motion of the driver 110 into translational, or linear, motion.

Figure 12:
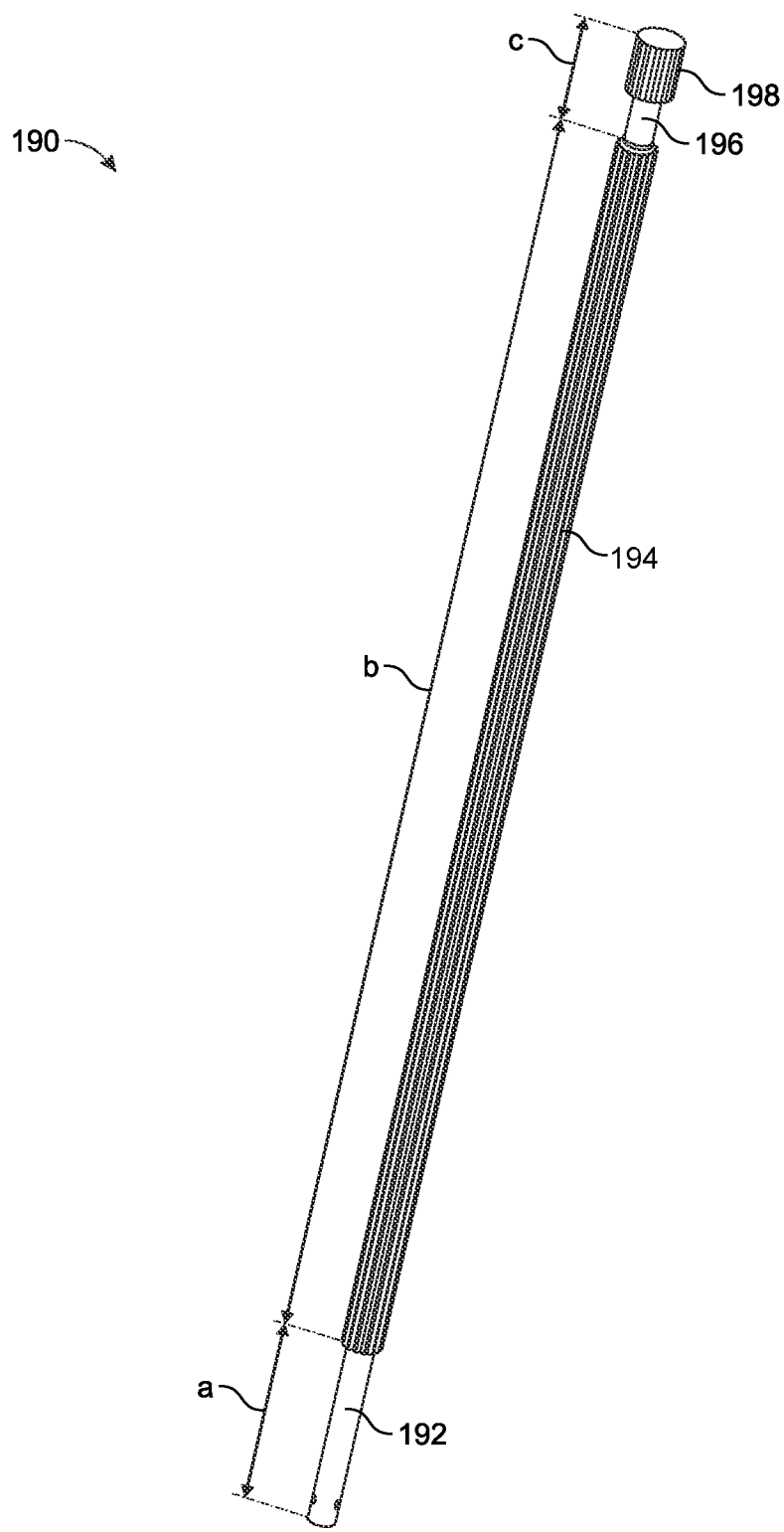
FIG. 12 illustrates a view of the cutting head shaft of the permanent lawn mower.

Referring to FIG. 12, a view of the cutting head shaft of the permanent lawn mower is shown.

The cutting head shaft 190 includes a smooth lower section 192, splined center section 194, smooth upper section 196, and splined head 198.

During operation, when the ascender 160 (see FIG. 10) is in section a, the ascender 160 and driver 110 (see FIG. 10) are disengaged from the cutting head shaft 190.

When the ascender 160 rises to section b, it is engaged with the cutting head shaft 190, but the driver 110 is disengaged.

Finally, at section c, the driver 110 is engaged, and the ascender 160 is disengaged.

Figure 13:
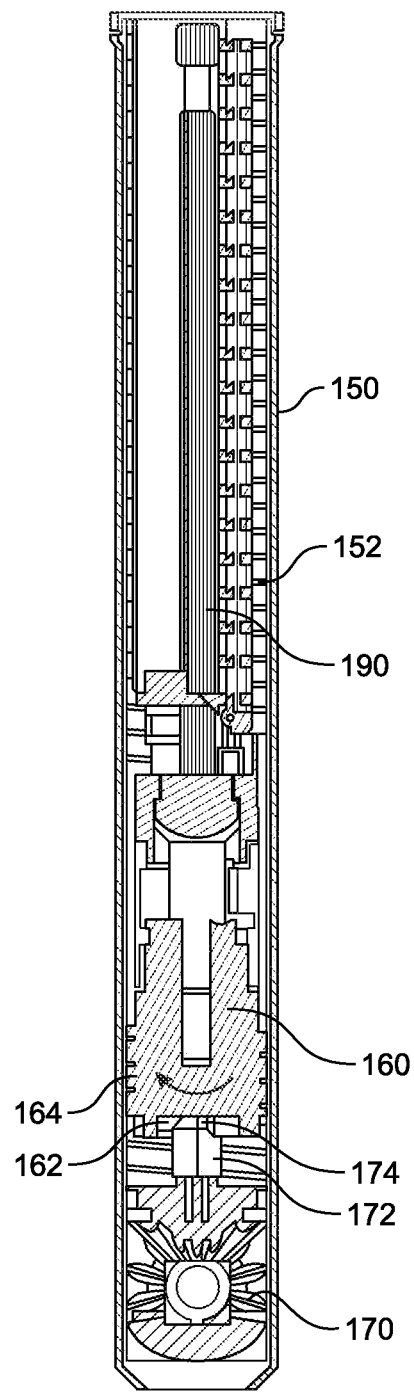
FIG. 13 illustrates a cross-section of the cutting head in a retracted position of the permanent lawn mower.

Referring to FIG. 13, a cross-section of the cutting head in a retracted position of the permanent lawn mower is shown.

The transmission gear 170 has just started rotating, carry rotation to the cutting head shaft gear 172 and its cutting head shaft gear clutch 174, which in turn rotates the clutch 162 of the ascender 160, thus starting the upward movement of the ascender 160.

The threaded base 164 of the ascender 160 rotates within the tube 150, interfacing with the internal threads 152.

Figure 14:
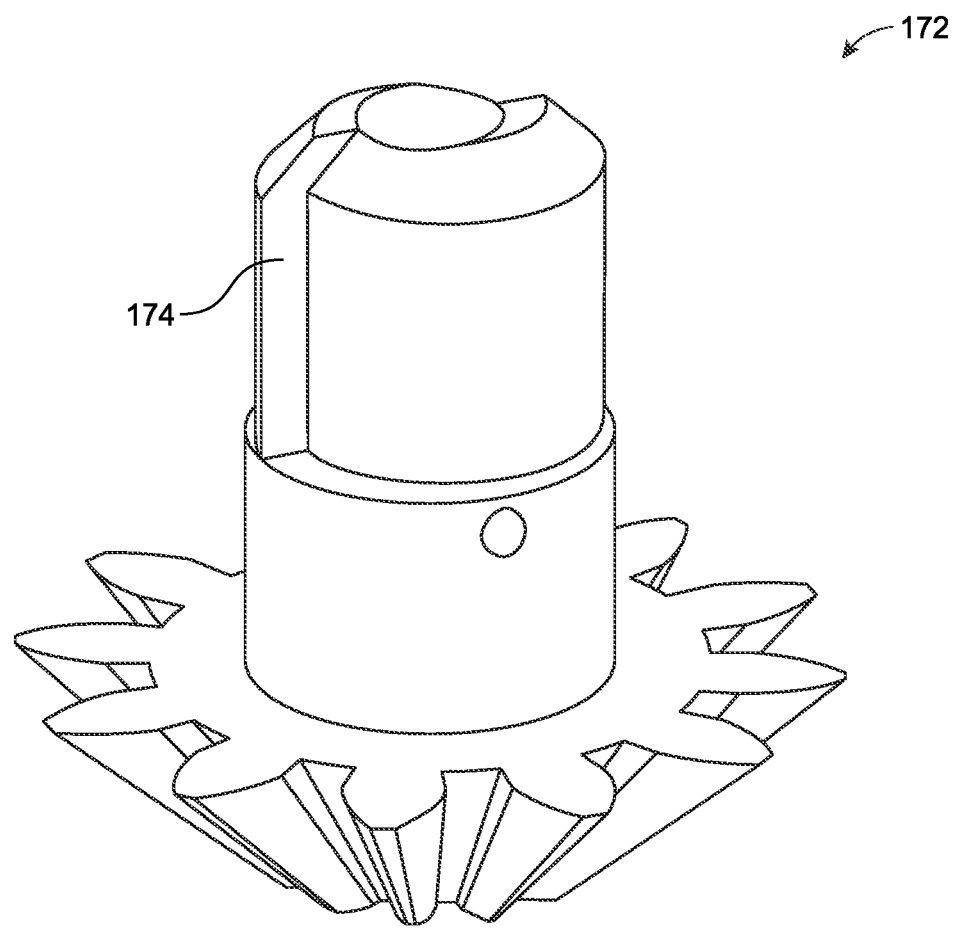
FIG. 14 illustrates a view of cutting head shaft gear of the permanent lawn mower.

Referring to FIG. 14, a view of cutting head shaft gear of the permanent lawn mower is shown.

The cutting head shaft gear clutch 174 of the cutting head shaft gear 172 is shown.

Figure 15:
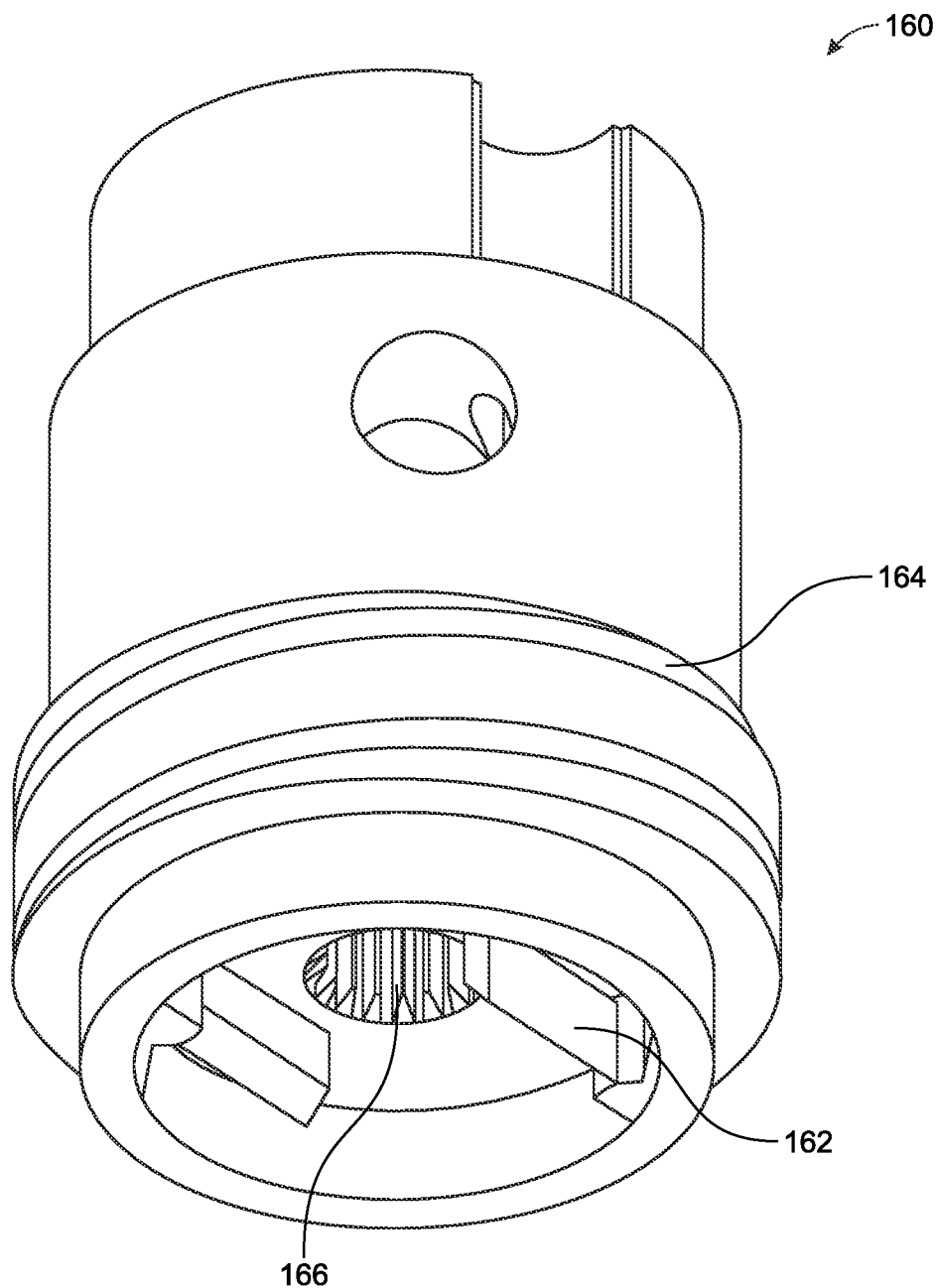
FIG. 15 illustrates a view of the ascender of the permanent lawn mower.

Referring to FIG. 15, a view of the ascender of the permanent lawn mower is shown.

The ascender 160 is shown with the clutch 162, shown as flexible cantilevers. The threaded base 164 interfaces with the internal threads 152 of the tube 150 (see FIG. 13).

The internal splines 166 interfaces with the cutting head shaft 190.

Figure 16:
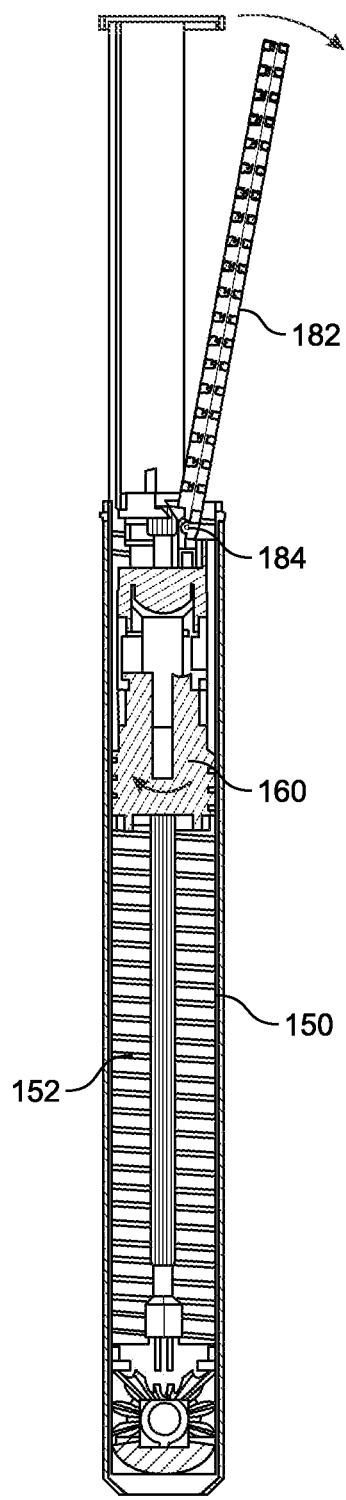
FIG. 16 illustrates a cross-section of the cutting head in a partially-extended position of the permanent lawn mower.

Referring to FIG. 16, a cross-section of the cutting head in a partially-extended position of the permanent lawn mower is shown.

The ascender 160 has risen within the tube 150, allowing the blade guard 182 to descend toward its horizontal position, rotating about its blade guard hinge 184.

Figure 17:
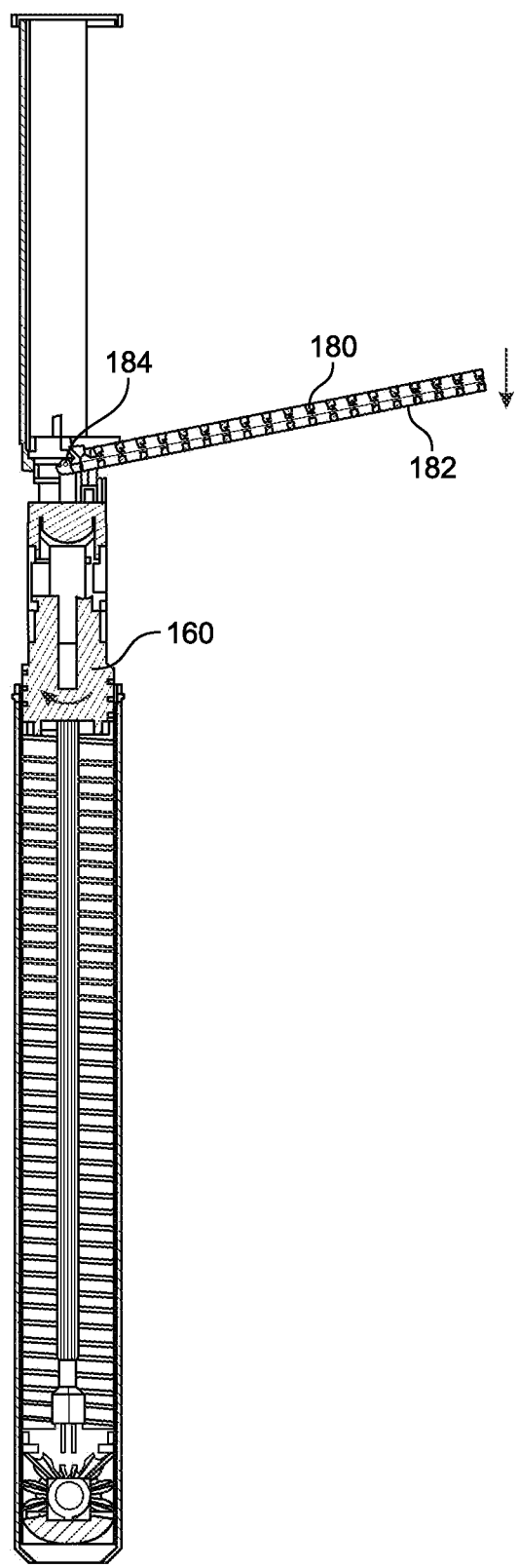
FIG. 17 illustrates a cross-section of the cutting head in a near-full extended position of the permanent lawn mower.

Referring to FIG. 17, a cross-section of the cutting head in a near-full extended position of the permanent lawn mower is shown.

The ascender 160 is nearly at its full height, the blade 180 are nearly in position.

Figure 18:
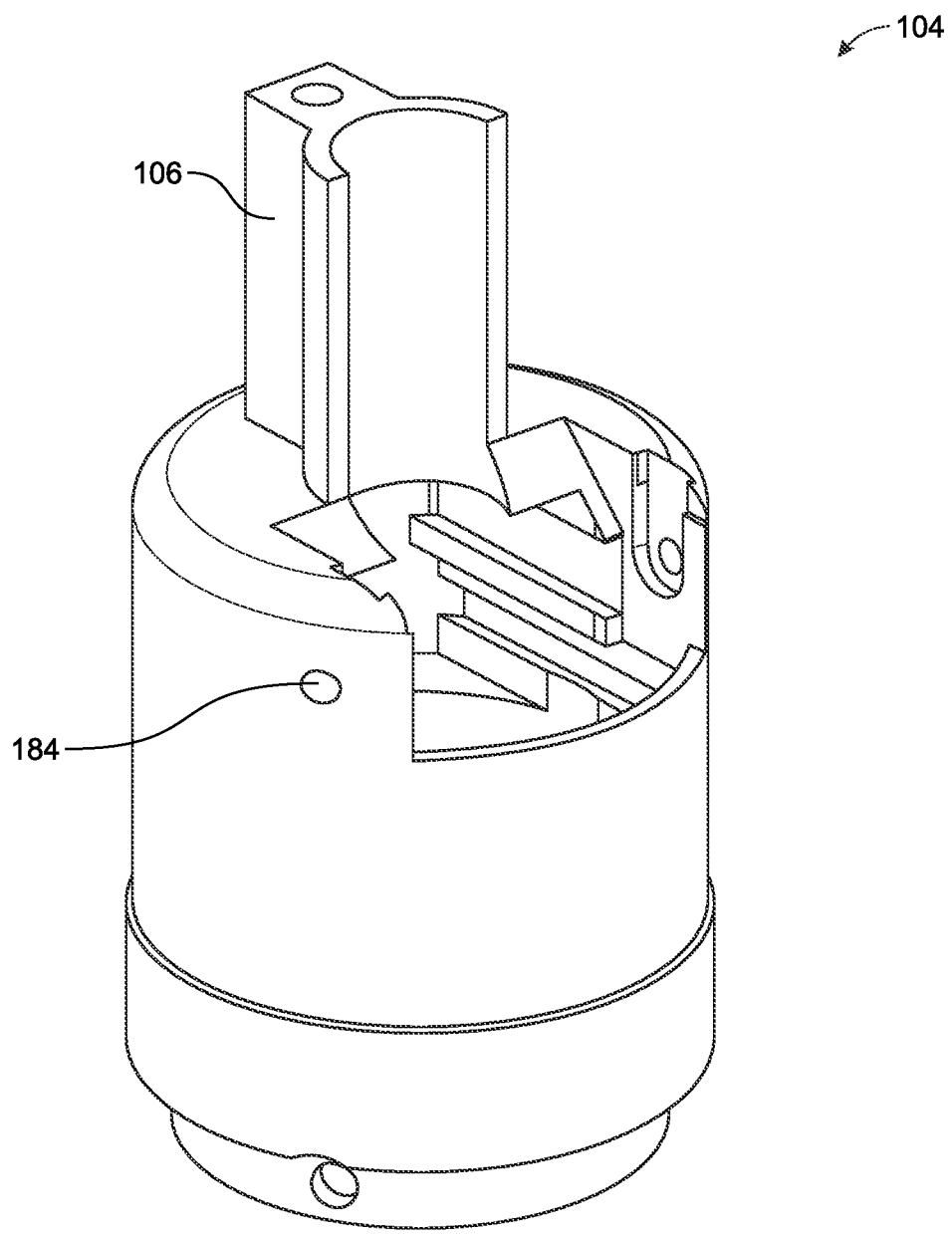
FIG. 18 illustrates a view of the top housing of the permanent lawn mower.

Referring to FIG. 18, a view of the top housing of the permanent lawn mower is shown.

The top housing 104 includes a seal interface 106 to affix to the seal 102 (see FIG. 8). The holes for blade guard hinge 184 is shown.

Figure 19:
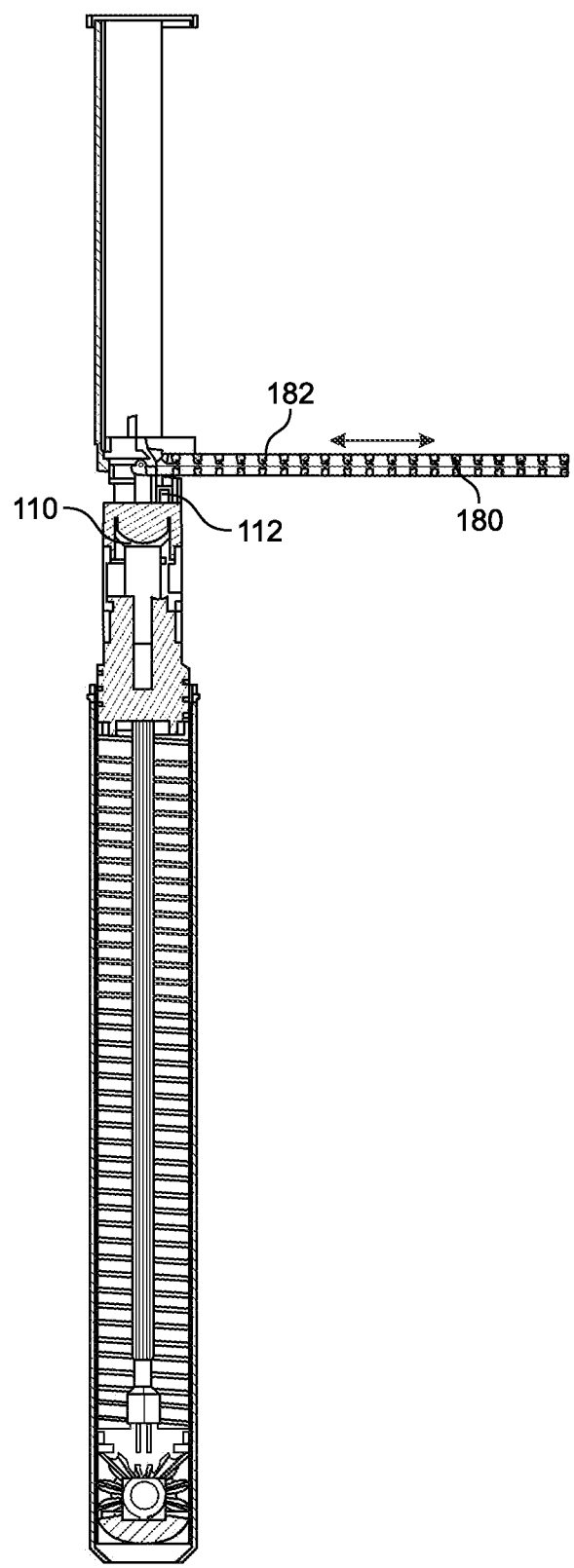
FIG. 19 illustrates a cross-section of the cutting head in a cutting position of the permanent lawn mower.

Referring to FIG. 19, a cross-section of the cutting head in a cutting position of the permanent lawn mower is shown.

The Scotch-Yoke pin 112 of the driver 110 is converting the rotation of the driver 110 into linear motion, causing the blade 180 to move within the blade guard 182.

Referring to FIG. 20, a partial view of the cutting head in a cutting position of the permanent lawn mower is shown.

Again, rotation of the driver 110 moves the blade connector 186 with its internal slot, causing the blade 180 to move in-and-out with respect to the blade guard 182.

Figure 21:
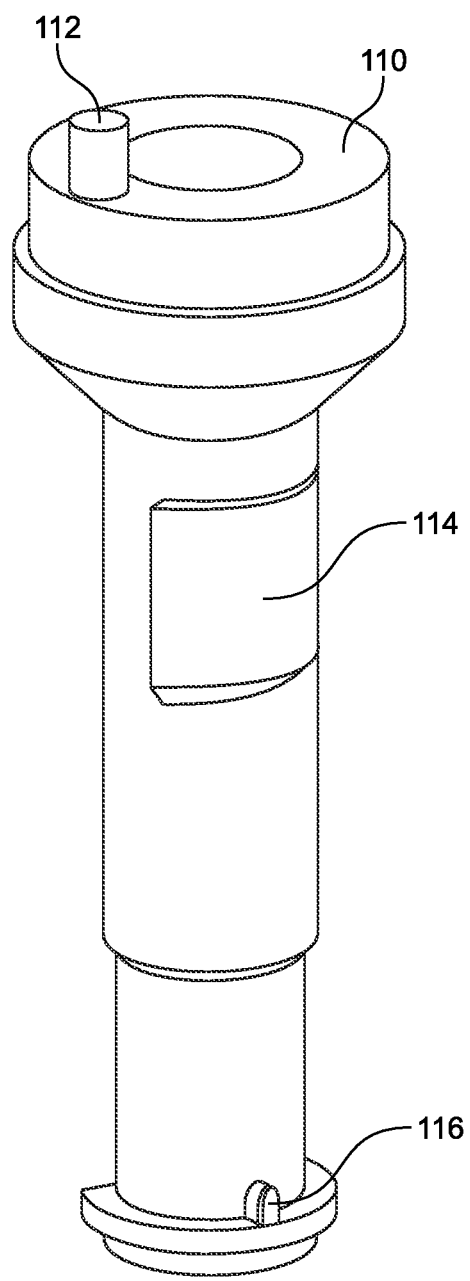
FIG. 21 illustrates a view of the driver of the permanent lawn mower.
Figure 22:
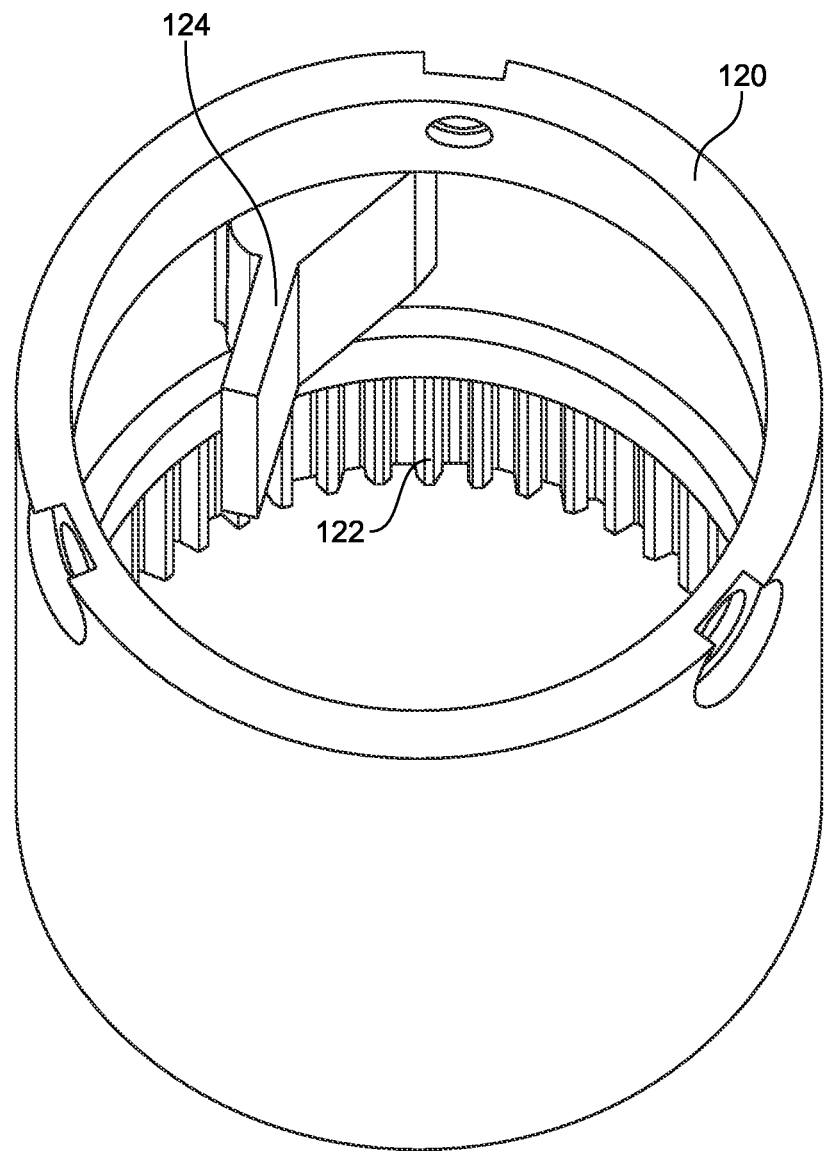
FIG. 22 illustrates a view of the orbital of the permanent lawn mower.
Figure 23:
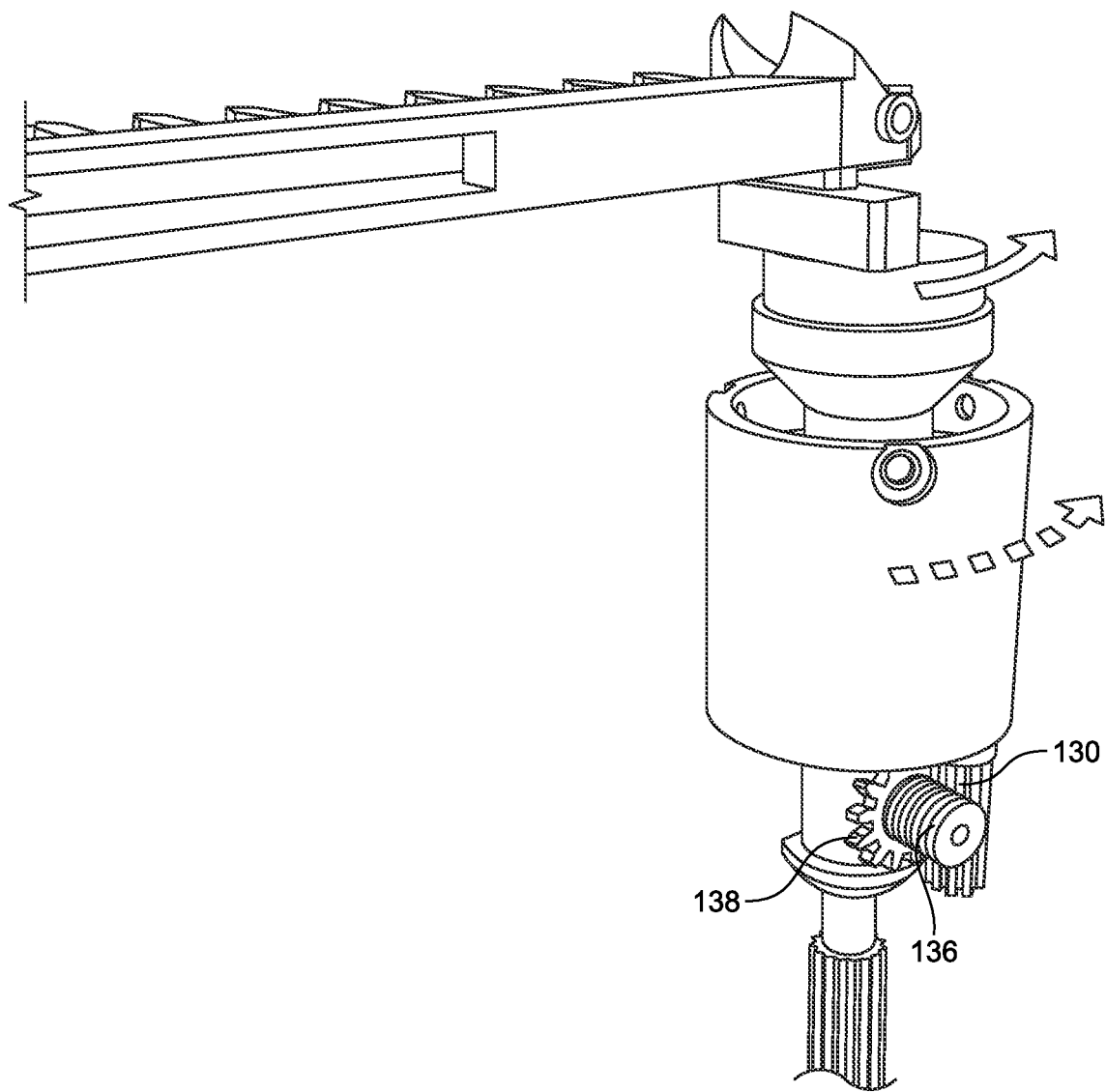
FIG. 23 illustrates a second partial view of the cutting head in a cutting position of the permanent lawn mower.

Referring to FIGS. 21, 22, and 23, views of the driver and orbital, separately and in action, of the permanent lawn mower are shown.

The driver 110 includes a Scotch-Yoke pin 112, reverse clutch 114, and gear tooth 116.

The orbital 120 includes internal threads 122 and protruding catch 124.

During cutting, rotation of the driver 110 causes the gear tooth 116 to rotate the driver gear tooth interface gear 138 once per driver 110 rotation, which in turn rotates the worm gear 136, rotating the orbital gear 130, and in turn the internal threads 122 of the orbital 120. This causes the intermittent rotation of the orbital 120, moving the blade 180 (see FIG. 20) through a circle.

During the cutting operation, the reverse clutch 114 of the driver 110 and the protruding catch 124 of the orbital 120 bypass each other, allowing the driver 110 to rotate without causing continuous rotation of the orbital 120.

When the driver 110 reverses, the reverse clutch 114 grabs the protruding catch 124, causing the orbital 120 to rotate, initialing descent.

Figure 24:
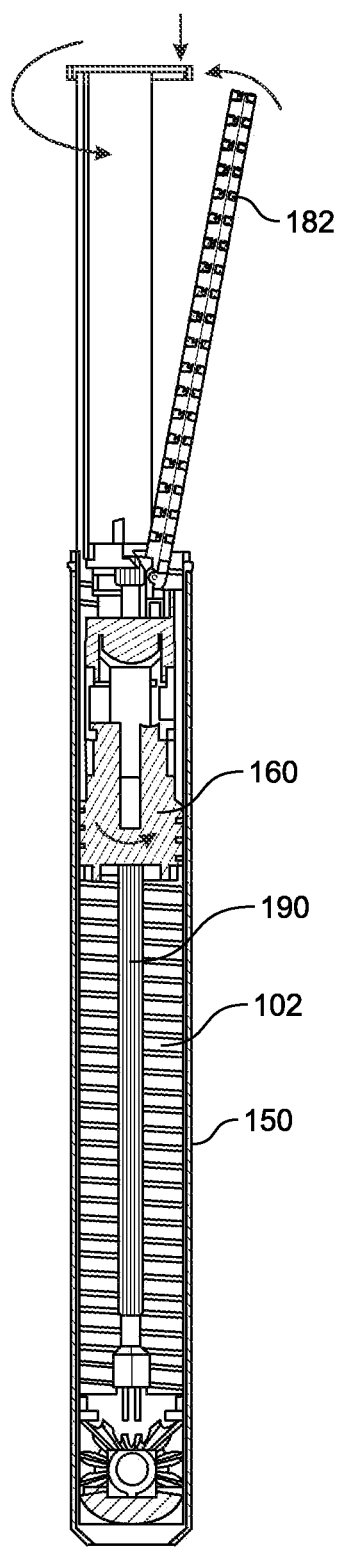
FIG. 24 illustrates a cross-section of the cutting head as it folds of the permanent lawn mower.

Referring to FIG. 24, a cross-section of the cutting head as it folds of the permanent lawn mower is shown.

The reverse in direction of the cutting head shaft 190 has triggered the driver 110 to rotate the orbital 120, starting downward motion of the ascender 160, which then interfaces with the cutting head shaft 190 to continue rotation and movement downward.

Figure 25:
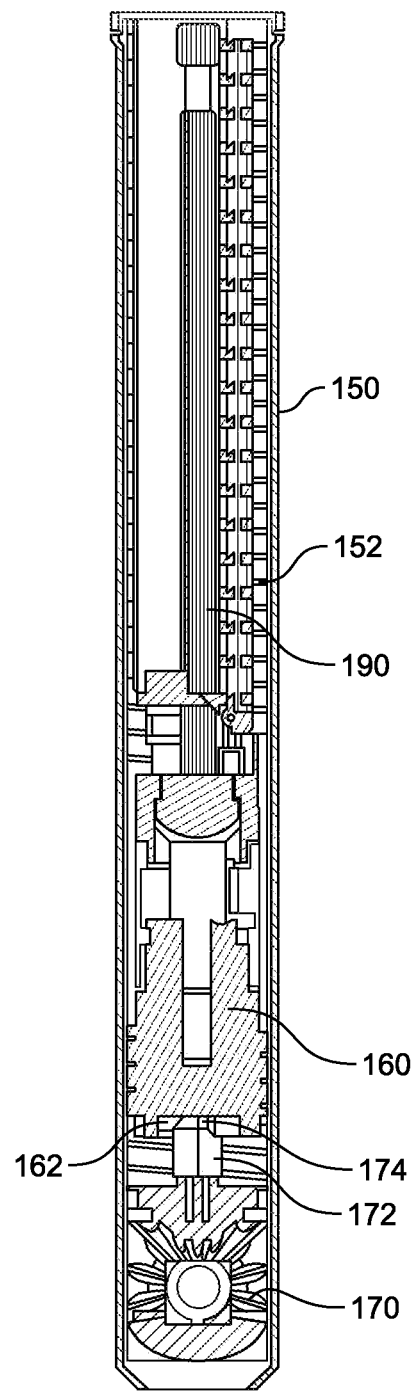
FIG. 25 illustrates a cross-section of the cutting head after folding of the permanent lawn mower.

Referring to FIG. 25, a cross-section of the cutting head after folding of the permanent lawn mower is shown.

The ascender 160 has bottomed out, and no longer interfaces with the cutting head shaft 190. Continued rotation of the transmission gear 170 causes rotation of the cutting head shaft gear clutch 174 with respect to the clutch 162 of the ascender 160, causing no rotation of the ascender 160.

When rotation stops, the cutting head 100 awaits future activation.

Figure 26:
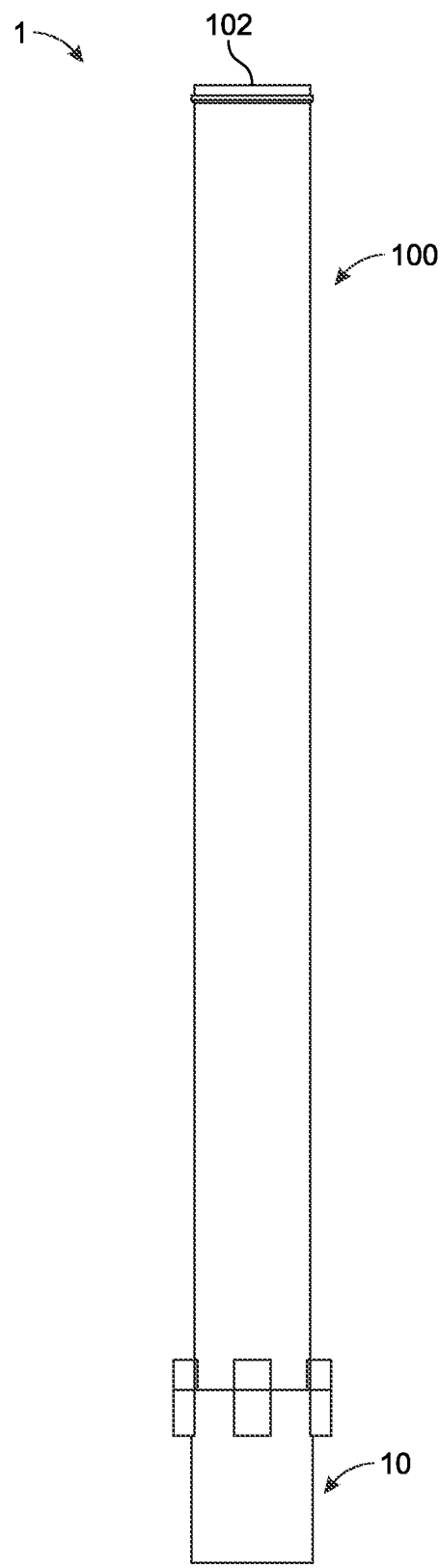
FIG. 26 illustrates an outer view of a second embodiment, in a retracted position, of the permanent lawn mower.
Figure 27:
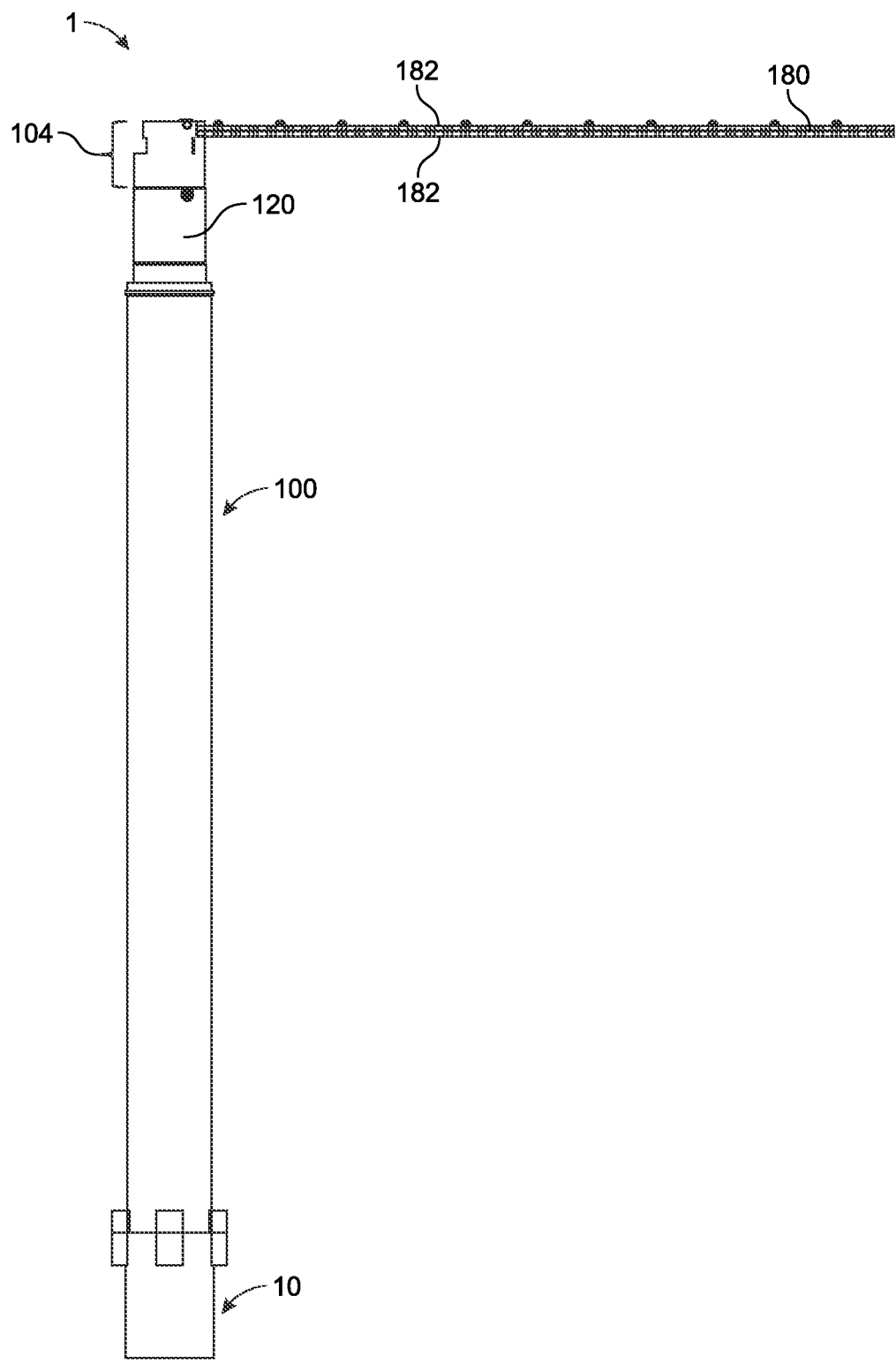
FIG. 27 illustrates a second outer view of a second embodiment, in an extended position, of the permanent lawn mower.

Referring to FIGS. 26 and 27, an outer view of a second embodiment, in a retracted position and an extended position, of the permanent lawn mower is shown.

In the second embodiment, the drive unit 10 is relocated from a central unit that powers multiple cutting heads 100, to individual drive units 10 that each power an associated cutting head 100.

Again shown, in the extended position the blade 180 is shown, this time sandwiched between two blade guards 182.

The top housing 104 is visible in the extended position, with the orbital 120 protruding above the tube 150.

Figure 28:
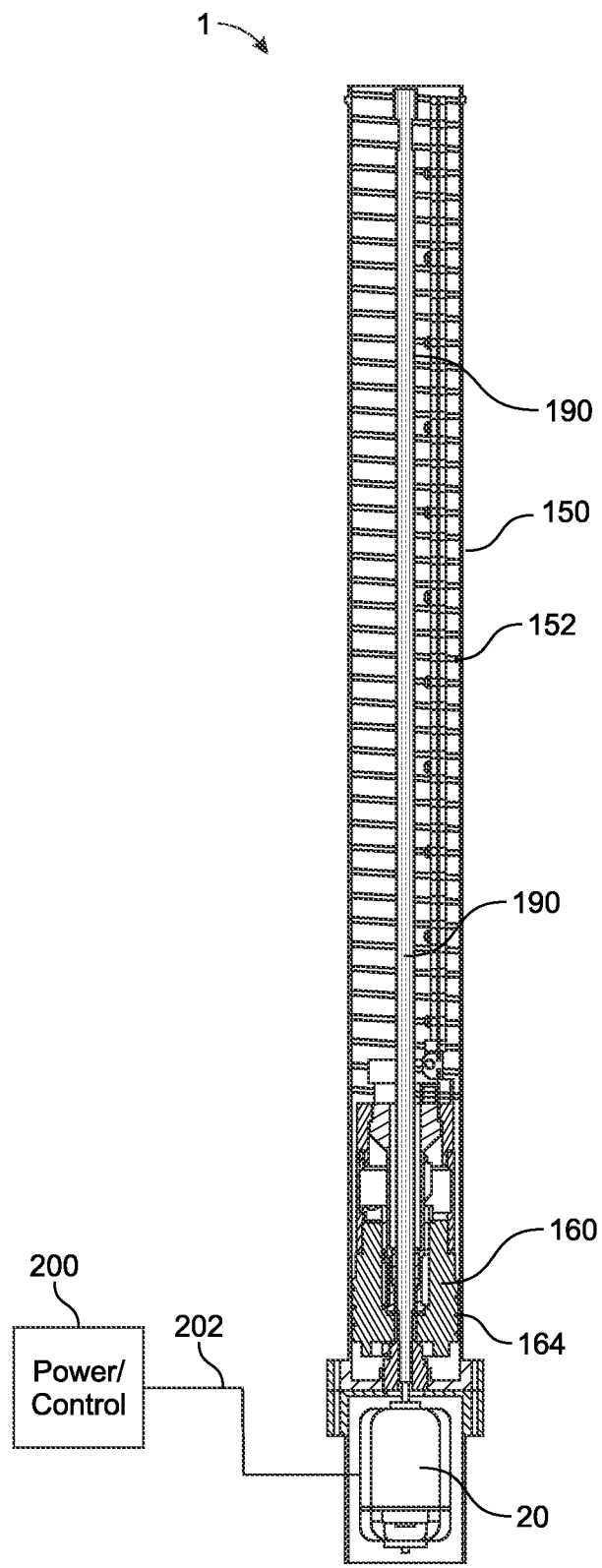
FIG. 28 illustrates a cross-section of the second embodiment, in a retracted position, of the permanent lawn mower.
Figure 29:
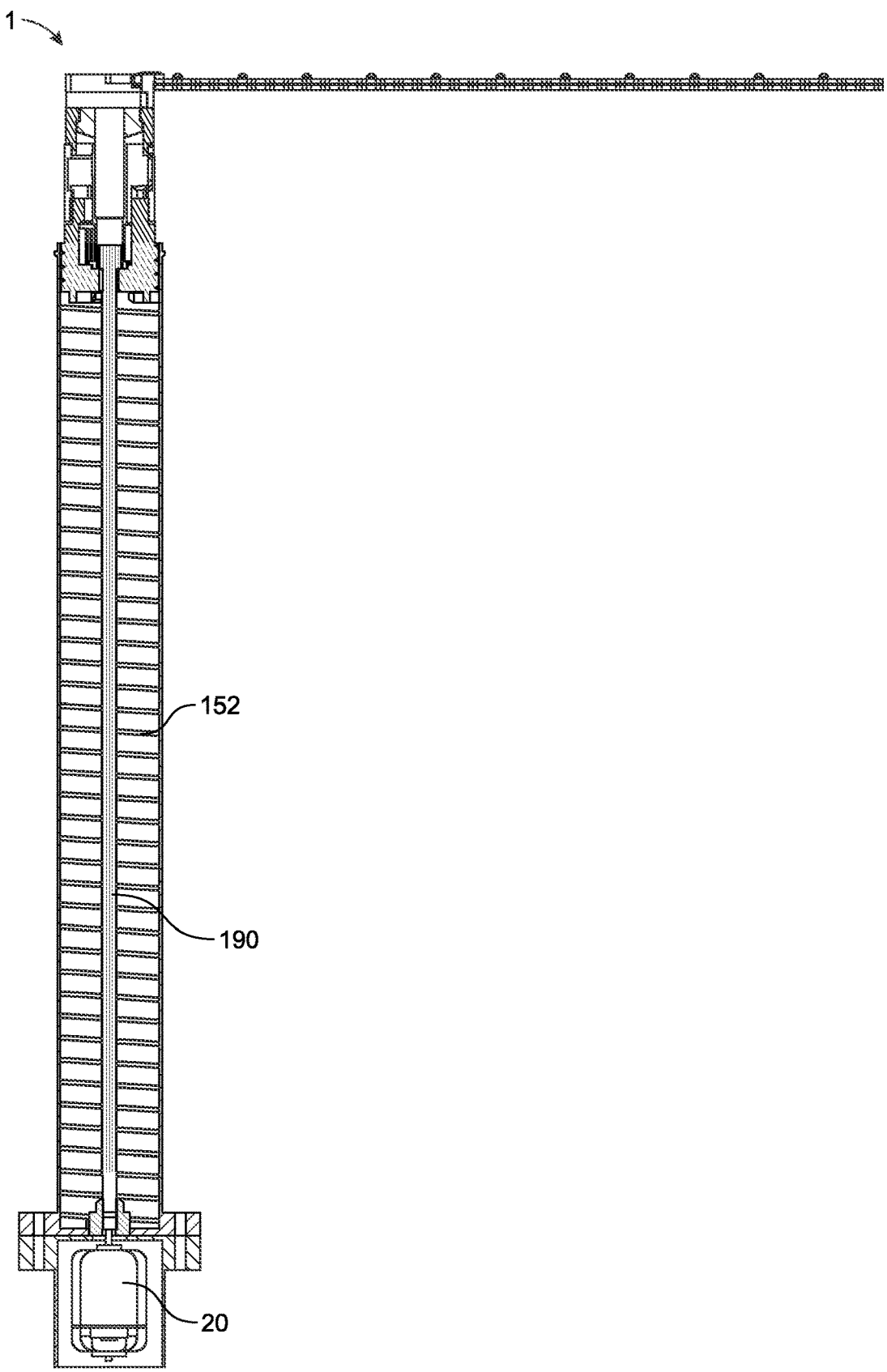
FIG. 29 illustrates a cross-section of the second embodiment, in an extended position, of the permanent lawn mower.

Referring to FIGS. 28 and 29, a cross-section of the second embodiment, in a retracted position and an extended position, of the permanent lawn mower is shown.

The motor 20—generally an electric motor—is shown within drive unit 10. The motor 20 is powered and controlled by the power and control system 200, connected to the motor 20 by wiring 202.

A single power and control system 200 can connect to multiple cutting heads 100 via wiring 202, allowing for complex control schemes. For example, sequencing the operation of cutting heads 100 to limit the maximum power requirements, or to mow different sections of lawn depending on anticipated availability.

The motor 20 connects to the cutting head shaft gear 172 and its cutting head shaft gear clutch 174, which in turn rotates the clutch 162 of the ascender 160, thus starting the upward movement of the ascender 160.

The threaded base 164 of the ascender 160 rotates within the tube 150, interfacing with the internal threads 152.

Figure 30:
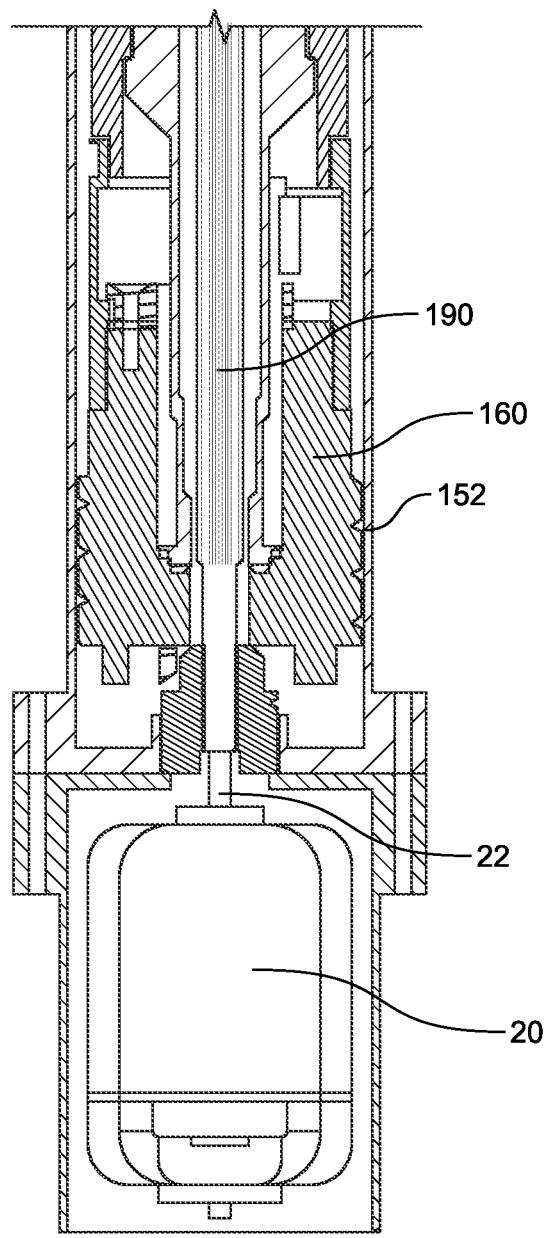
FIG. 30 illustrates a detailed cross-section view of the second embodiment of the permanent lawn mower.

Referring to FIG. 30, a detailed cross-section view of the second embodiment of the permanent lawn mower is shown.

The motor 20 is connected to the cutting head shaft 190, powering the cutting head 100 in the same manner as in the first embodiment.

With the exception of the location of the drive unit, the second embodiment of the permanent lawn mower 1 operates as does the first embodiment. For example, the ascender 160 still moves up and down the cutting head shaft 190 to cause the differing operations of the cutting head 100.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A permanent lawn mower for installation in soil, the permanent lawn mower comprising:
   one or more cutting heads;
      the one or more cutting heads each including a blade that extends up and out of a housing, the blade cutting surrounding grass, the blade then retracting into the housing;
      the housing surrounding a cutting head of the one or more cutting heads when in a retracted position;
      each cutting head of the one or more cutting heads moving along a cutting head shaft;
      the housing includes internal threads;
   a drive unit;
      the drive unit causing the one or more cutting heads to extend up and out of the housing;
      the drive unit causing the blade to oscillate, creating a cutting action;
      the drive unit causing the blade to retract into the housing;
   an ascender;
      the ascender internally splined to interact with external splines of the cutting head shaft;
      the ascender externally threaded to interface with the internal threads of the housing;
      rotation of the cutting head shaft causing rotation of the ascender, in turn causing extension or retraction of the one or more cutting heads;
   whereby the ascender interacts with the housing to convert rotational motion of the cutting head shaft into upward and downward movement of the one or more cutting heads; and
   whereby the one or more cutting heads are installed in areas that are difficult to access, thus avoiding use of a mobile lawn mower.

2. The permanent lawn mower for installation in soil of claim 1, wherein;
   the drive unit includes:
      an electric motor;
   whereby the electric motor rotates, thus causing rotation of the cutting head shaft.

3. The permanent lawn mower for installation in soil of claim 1, wherein the drive unit is separate from the housing, and rotational motion from the drive unit is carried to the one or more cutting heads by a rotating cable.

4. The permanent lawn mower for installation in soil of claim 1, further comprising:
   the blade within a blade guard;
   a driver and an orbital around the cutting head shaft;
      the ascender starting at a first position, disengaged from rotation of the cutting head shaft; with rotation of the ascender caused by a clutch between a transmission gear and the ascender, rotation of the cutting head shaft causing the ascender, orbital, and driver to move up the internal threads of the housing;

the ascender moving to a second position, where it interfaces with the cutting head shaft, continued rotation causing continued climbing of the ascender; and the ascender moving to a third position, where the ascender is again disengaged from the cutting head shaft, but the driver is engaged and rotating, rotation of the driver causing linear motion of the blade with respect to the blade guard;

whereby movement of the ascender with respect to the internal threads of the housing allows the one or more cutting heads to have an active and extended position and a retracted and waiting position.

5. A device for cutting grass, the device permanently installed in soil, the device comprising:
a housing;
the housing installed by being buried within the soil;
the housing includes internal threads;
a cutting head;
the cutting head having a first position and a second position:
the first position being the cutting head within the housing, awaiting activation;
the second position being the cutting head extended out of the housing, ready to cut grass;
a cutting head shaft;
the cutting head shaft within the housing;
rotation of the cutting head shaft causing rotation that creates upward movement along the internal threads of the housing, thus causing operation of the cutting head;
a motor;
the motor rotating to cause the cutting head to move from the first position to the second position;
an ascender;
the ascender internally splined to interact with external splines of the cutting head shaft;
the ascender externally threaded to interface with the internal threads of the housing;
rotation of the cutting head shaft causing rotation of the ascender, in turn causing extension or retraction of the cutting head;
whereby the ascender interacts with the housing to convert rotational motion of the cutting head shaft into upward and downward movement of the cutting head; and
whereby the device for cutting grass is installed in areas where conventional mowing is difficult.

6. The device for cutting grass of claim 5, wherein:
the motor also causes a blade within the cutting head to oscillate, creating a grass-cutting action;
whereby the motor is only one motor, but causes both extension and retraction of the cutting head, and operation of the blade within the cutting head.

7. The device for cutting grass of claim 5, wherein;
the motor is an electric motor;
whereby the electric motor rotates, thus causing rotation of the cutting head shaft.

8. The device for cutting grass of claim 7, wherein:
the electric motor is within the housing.

9. The device for cutting grass of claim 7, wherein the electric motor is separate from the housing, and rotational motion from the electric motor is carried to the cutting head by a rotating cable.

10. The device for cutting grass of claim 5, further comprising:
a blade within a blade guard;
a driver and an orbital around the cutting head shaft;
the ascender starting at a first position, disengaged from rotation of the cutting head shaft; with rotation of the ascender caused by a clutch between a transmission gear and the ascender, rotation of the cutting head shaft causing the ascender, orbital, and driver to move up the internal threads;
the ascender moving to a second position, where it interfaces with the cutting head shaft, continued rotation causing continued climbing of the ascender; and
the ascender moving to a third position, where the ascender is again disengaged from the cutting head shaft, but the driver is engaged and rotating, rotation of the driver causing linear motion of the blade with respect to the blade guard;
whereby movement of the ascender with respect to the internal threads allows the cutting head to have an active and extended position and a retracted and waiting position.

11. A permanent lawn mower for installation in soil, the permanent lawn mower comprising:
one or more cutting heads;
the one or more cutting heads each including a blade that extends up and out of a housing, the blade cutting surrounding grass, the blade then retracting into the housing;
each cutting head of the one or more cutting heads surrounded by the housing when in a retracted position;
the housing includes internal threads;
each cutting head of the one or more cutting heads moving along a cutting head shaft;
rotation of the cutting head shaft causing rotation that creates upward movement along the internal threads of the housing;
a drive unit;
the drive unit rotating the cutting head shaft;
the drive unit causing the one or more cutting heads to extend up and out of the housing;
the drive unit causing the blade to oscillate, creating a cutting action;
the drive unit causing the blade to retract into the housing;
an ascender;
the ascender internally splined to interact with external splines of the cutting head shaft;
the ascender externally threaded to interface with the internal threads of the housing;
rotation of the cutting head shaft causing rotation of the ascender, in turn causing extension or retraction of the one or more cutting heads;
whereby the one or more cutting heads are installed in areas that are difficult to access, thus avoiding use of a mobile lawn mower.

* * * * *